United States Patent
Qian et al.

(10) Patent No.: US 11,704,812 B2
(45) Date of Patent: Jul. 18, 2023

(54) METHODS AND SYSTEM FOR MULTI-TARGET TRACKING

(71) Applicant: SZ DJI TECHNOLOGY CO., LTD., Shenzhen (CN)

(72) Inventors: Jie Qian, Shenzhen (CN); Hongda Wang, Shenzhen (CN); Qifeng Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 206 days.

(21) Appl. No.: 16/720,929

(22) Filed: Dec. 19, 2019

(65) Prior Publication Data

US 2020/0126239 A1 Apr. 23, 2020

Related U.S. Application Data

(63) Continuation of application No. PCT/CN2018/073664, filed on Jan. 22, 2018.

(51) Int. Cl.
*G06T 7/20* (2017.01)
*B64C 39/02* (2023.01)
*B64D 47/08* (2006.01)
*G01S 3/786* (2006.01)
*G05D 1/00* (2006.01)

(52) U.S. Cl.
CPC .............. *G06T 7/20* (2013.01); *B64C 39/024* (2013.01); *B64D 47/08* (2013.01); *G01S 3/7864* (2013.01); *G05D 1/0094* (2013.01)

(58) Field of Classification Search
CPC ... G06T 7/20; B64C 39/024; B64C 2201/127; B64D 47/08; G01S 3/7864; G01S 5/16; G01S 11/12; G05D 1/0094

USPC ......................................................... 382/103
See application file for complete search history.

(56) References Cited

U.S. PATENT DOCUMENTS

| | | | | |
|---|---|---|---|---|
| 9,643,722 | B1 * | 5/2017 | Myslinski | H04N 7/183 |
| 10,110,814 | B1 * | 10/2018 | Day | H04N 5/2258 |
| 10,198,634 | B2 * | 2/2019 | Zhou | G06V 20/52 |
| 10,386,188 | B2 * | 8/2019 | Tian | G06V 10/751 |
| 2007/0183783 | A1 * | 8/2007 | Lam | H04B 10/806 |
| | | | | 398/123 |
| 2010/0163621 | A1 * | 7/2010 | Ben-Asher | G05D 1/104 |
| | | | | 235/412 |

(Continued)

FOREIGN PATENT DOCUMENTS

| | | |
|---|---|---|
| CN | 105847684 A | 8/2016 |
| CN | 106161953 A | 11/2016 |

(Continued)

OTHER PUBLICATIONS

The World Intellectual Property Organization (WIPO) International Search Report and Written Opinion for PCT/CN2018/073664 dated Sep. 26, 2018 10 Pages.

*Primary Examiner* — Jerome Grant, II
(74) *Attorney, Agent, or Firm* — Anova Law Group, PLLC

(57) ABSTRACT

A computer-implemented method for tracking multiple targets includes identifying a plurality of targets based on a plurality of images obtained from an imaging device carried by an unmanned aerial vehicle (UAV) via a carrier, determining a target group comprising one or more targets from the plurality of targets, and controlling at least one of the UAV or the carrier to track the target group.

20 Claims, 22 Drawing Sheets

(56) References Cited

U.S. PATENT DOCUMENTS

| | | | |
|---|---|---|---|
| 2017/0083748 A1 | 3/2017 | Zhou et al. | |
| 2017/0126309 A1* | 5/2017 | Rupasinghe | H04B 7/0617 |
| 2017/0235316 A1* | 8/2017 | Shattil | B64C 39/024 |
| | | | 701/3 |
| 2017/0313416 A1* | 11/2017 | Mishra | G06K 9/0063 |
| 2017/0371353 A1 | 12/2017 | Millinger, III | |
| 2018/0126557 A1* | 5/2018 | Gu | G05B 19/4015 |
| 2018/0131869 A1* | 5/2018 | Kim | H04N 5/232127 |
| 2018/0213597 A1* | 7/2018 | Hayama | G05D 1/104 |
| 2019/0212741 A1* | 7/2019 | Lee | G01R 29/0892 |
| 2019/0351557 A1* | 11/2019 | Suzuki | G06T 7/75 |
| 2020/0034621 A1* | 1/2020 | Ooba | G05B 19/0426 |
| 2021/0209332 A1* | 7/2021 | Nishio | G06K 9/00281 |
| 2021/0209954 A1* | 7/2021 | Tazume | G08G 5/0065 |
| 2021/0266451 A1* | 8/2021 | Takahashi | H04N 5/23299 |

FOREIGN PATENT DOCUMENTS

| | | | | |
|---|---|---|---|---|
| CN | 107505951 A | | 12/2017 | |
| JP | 2005214914 A | | 8/2005 | |
| JP | 2017503226 A | | 1/2017 | |
| JP | 2017163511 A | | 9/2017 | |
| JP | 2018510399 | * | 4/2018 | G06N 20/00 |
| WO | 2017041303 A1 | | 3/2017 | |
| WO | 2017143589 A1 | | 8/2017 | |

\* cited by examiner

METHODS AND SYSTEM FOR MULTI-TARGET TRACKING

CROSS-REFERENCE TO RELATED APPLICATION

This application is a continuation of International Application No. PCT/CN2018/073664, filed Jan. 22, 2018, the entire content of which is incorporated herein by reference.

BACKGROUND

Unmanned aerial vehicles (UAVs) equipped with imaging devices are useful in a wide variety of applications including surveillance, reconnaissance, and explorations. An important task in such applications is the tracking target targets as the target objects and/or the UAV move in the surrounding environment. The task can be especially challenging when multiple target objects need to be tracked.

SUMMARY

According to embodiments, a computer-implemented method is provided for tracking multiple targets. The method comprises identifying a plurality of targets based on a plurality of images obtained from an imaging device carried by an unmanned aerial vehicle (UAV) via a carrier; determining a target group comprising one or more targets from the plurality of targets; and controlling the UAV and/or the carrier to track the target group.

According to embodiments, a tracking system is provided. The tracking system comprises a memory that stores one or more computer-executable instructions; and one or more processors configured to access the memory and execute the computer-executable instructions to perform a method comprising: identifying a plurality of targets based on a plurality of images obtained from an imaging device carried by an unmanned aerial vehicle (UAV) via a carrier; determining a target group comprising one or more targets from the plurality of targets; and controlling the UAV and/or the carrier to track the target group.

According to embodiments, one or more non-transitory computer-readable storage media is provided. The one or more non-transitory computer-readable storage media stores computer-executable instructions that, when executed by a computing system, configure the computing system to perform a method comprising: a memory that stores one or more computer-executable instructions; and one or more processors configured to access the memory and execute the computer-executable instructions to perform a method comprising: identifying a plurality of targets based on a plurality of images obtained from an imaging device carried by an unmanned aerial vehicle (UAV) via a carrier; determining a target group comprising one or more targets from the plurality of targets; and controlling the UAV and/or the carrier to track the target group.

In some embodiments, determining the target group comprises selecting the one or more targets from the plurality of targets based on a target state associated with each of the one or more targets.

In some embodiments, determining the target group comprises selecting one or more targets from the plurality of targets based on a primary target.

In some embodiments, the method further comprises determining a target group state of the target group based a target state of each of the one or more target. The target group state can be used for controlling the UAV and/or the carrier to track the target group. The target group state or the target state can comprise at least one of a position, a size, a velocity, or an orientation.

In some embodiments, the method further comprises updating the target group and controlling the UAV and/or the imaging device to track the updated target group.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The systems, devices, and methods are provided for tracking multiple target objects using movable object such as UAVs. In particular, a plurality of target objects can be identified based on images obtained from imaging devices carried by a UAV. A target group comprising one or more target objects can be selected based on the plurality of target objects. A target group state can be determined based on individual state of the one or more target objects. The target group can be tracked as a whole based on the target group state.

Figure 1:
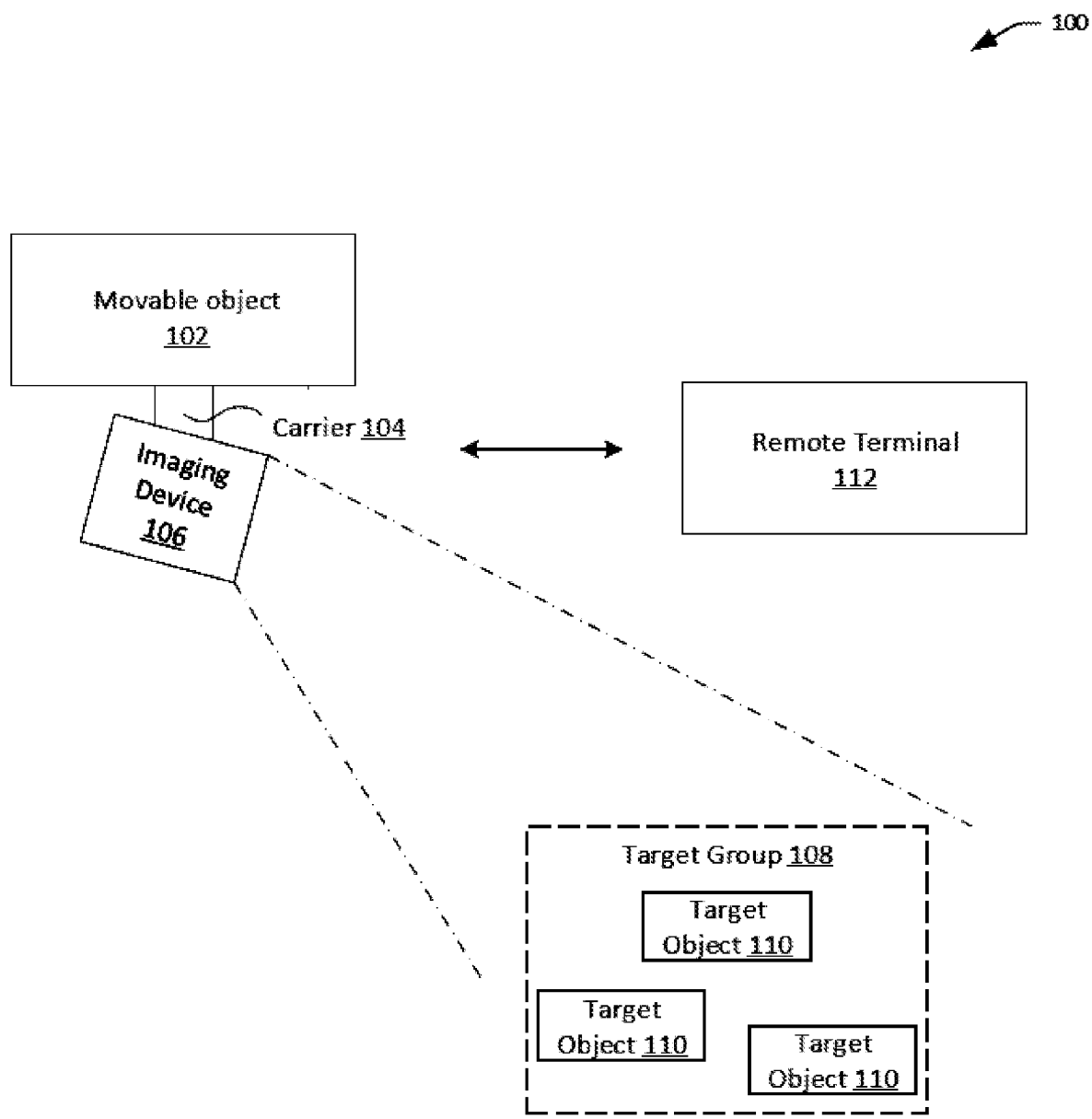
FIG. 1 illustrates a system for implementing multi-target tracking, in accordance with embodiments.

FIG. 1 illustrates a system 100 for implementing multi-target tracking, in accordance with embodiments. The tracking system 100 may include an imaging device 106, or a movable object 102 carrying an imaging device 106 with or without a carrier 104. In some embodiments, the tracking system 100 may optionally include a remote terminal 112. The tracking system 100 may be configured to track a target group 108 comprising one or more target objects 110.

In some embodiments, the movable object may be an unmanned aerial vehicle (UAV) such as described elsewhere herein. The payload may include a device capable of sensing the environment about the movable object, a device capable of emitting a signal into the environment, and/or a device capable of interacting with the environment.

The payload can include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). For example, the camera can be a mono-vision camera or a stereo-vision camera. The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc.). The camera may capture color images, greyscale image, infrared images, and the like. The camera may be a thermal imaging device when it is configured to capture infrared images.

In some embodiments, the payload may include multiple imaging devices, or an imaging device with multiple lenses and/or image sensors. The payload may be capable of taking multiple images substantially simultaneously. The multiple images may aid in the creation of a 3D scene, a 3D virtual environment, a 3D map, or a 3D model. For instance, a right image and a left image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

The payload and/or the movable object may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

In some embodiments, the payload 106 may be movably coupled to a movable object 102 via a carrier 104. The payload 106 and/or the carrier 104 may be located outside a housing of the movable object. The payload may move in a translational motion relative to the movable object. For instance, the payload may move along one, two or three axes relative to the movable object. The payload may also rotate relative to the movable object. For instance, the payload may rotate about one, two or three axes relative to the movable object. The axes may be orthogonal to on another. The axes may be a pitch, yaw, and/or roll axis of the carrier, imaging device, and/or the movable object.

The payload may move relative to the movable object with aid of the carrier. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

The movable object 102 and/or the imaging device 106 may be controlled to track one or more target objects 110 (also referred to as targets). In some embodiments, a target group 108 comprising one or more, or two or more target objects. A target object may be a stationary target or a moving target. In some instances, a user may identify a target object from an image frame, and may further specify whether the target object is a stationary target or a moving target. Alternatively, the user may provide any other type of indicator of whether the target object is a stationary target or a moving target. Alternatively, no indication may be provided, and a determination may be automatically made with aid of one or more processors, optionally without requiring user input whether the target object is a stationary target or a moving target. A target object may be classified as a stationary target or a moving target depending on its state of motion. In some cases, a target object may be moving or stationary at any given point in time. When the target object is moving, the target object may be classified as a moving target. Conversely, when the same target object is stationary, the target object may be classified as a stationary target. Alternatively, the target object may be carried by a living subject, such as a human or an animal, or a movable object such as a vehicle.

A stationary target may remain substantially stationary within an environment. Examples of stationary targets may include, but are not limited to landscape features (e.g., trees, plants, mountains, hills, rivers, streams, creeks, valleys, boulders, rocks, etc.) or manmade features (e.g., structures, buildings, roads, bridges, poles, fences, unmoving vehicles, signs, lights, etc.). Stationary targets may include large targets or small targets. A user may select a stationary target. Alternatively, the stationary target may be recognized using one or more image recognition methods. Optionally, the stationary target may be mapped. The movable object may travel to the stationary target. A path (e.g., flight path) may be planned for the movable object to travel to the stationary target. Alternatively, the movable object may travel to the stationary target without requiring a planned path. In some instances, the stationary target may correspond to a selected portion of a structure or object. For example, the stationary target may correspond to a particular section (e.g., top floor) of a skyscraper.

A moving target may be capable of moving within the environment. The moving target may always be in motion, or may be at motions for portions of a time. The moving target may move in a fairly steady direction or may change direction. The moving target may move in the air, on land, underground, on or in the water, and/or in space. The moving target may be a living moving target (e.g., human, animal) or a non-living moving target (e.g., moving vehicle, moving machinery, object blowing in wind or carried by water, object carried by living target). The moving target may include a single moving object or a group of moving objects. For instance, the moving target may include a single human or a group of moving humans. Moving targets may be large targets or small targets. A user may select a moving target. The moving target may be recognized. Optionally, the moving target may be mapped. The movable object may travel to the moving target and/or visually track the moving target. A path (e.g., flight path) may be planned for the movable object to travel to the moving target. The path may be changed or updated as the moving target moves. Alternatively, the movable object may travel to the moving target and/or visually track the moving target without requiring a planned path.

A moving target may be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments.

A moving target may be capable of moving freely within the environment with respect to six degrees of freedom (e.g., three degrees of freedom in translation and three degrees of freedom in rotation). Alternatively, the movement of the moving target can be constrained with respect to one or more degrees of freedom, such as by a predetermined path, track, or orientation. The movement can be actuated by any suitable actuation mechanism, such as an engine or a motor. The actuation mechanism of the moving target can be powered by any suitable energy source, such as electrical energy, magnetic energy, solar energy, wind energy, gravitational energy, chemical energy, nuclear energy, or any suitable combination thereof. The moving target may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the moving target can be a vehicle, such as a remotely controlled vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object may be, for example, a UAV. The target object may be a same type of movable object as the tracking device, or may be a different type of movable object as the tracking device. For instance, in some embodiments, both the tracking device and the target object may be UAVs. The tracking device and the target object may be the same type of UAV or different types of UAVs. Different types of UAVs may have different shapes, form factors, functionality, or other characteristics. The target object and the tracking device may move in 3-dimensional space relative to one or more background objects. Background objects as used herein may refer to objects that are substantially affixed at a location. Background objects may be incapable of motion, such as stationary objects. Examples of background objects may include geographic features (e.g., mountains), landmarks (e.g., bridges), buildings (e.g., skyscrapers, stadiums, etc.), or any fixed structures. Additionally, background objects may include objects that are stationary at a location at a first time instance, and moving at a second time instance. Some of the background objects or a portion of the background objects may be capable of motion (e.g., a stadium having a retractable rooftop, a movable bridge that lifts up to allow passage of water-bound vehicles, etc.).

The tracking system 100 may optionally include a remote terminal 112. In some embodiments, the remote terminal 112 may include one or more processors configured to process images generated by the imaging device to identify targets, estimate a state of one or more targets or target groups, and/or generate control signals for controlling the movable object and/or the carrier so as to track targets. In some embodiments, the remote terminal 112 may include a display configured to display one or more images obtained by the imaging device. The images may show a tracking indicator (e.g., a bounded box) with each identified target. The remote terminal 112 may include a user interface (e.g., a touchscreen) for a user to specify or select one or more targets to track.

Figure 2:
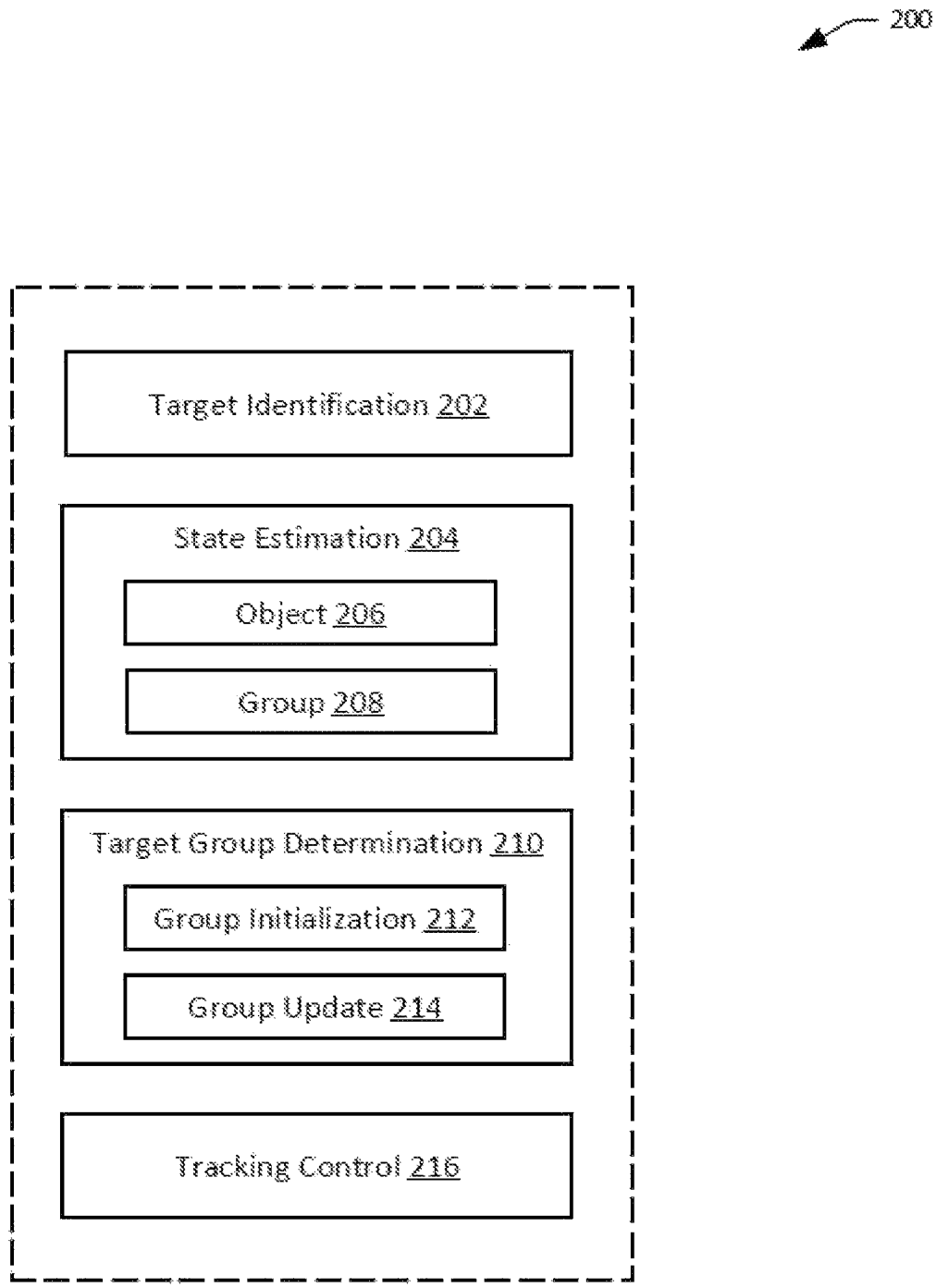
FIG. 2 illustrates example components in a tracking system, in accordance with embodiments.

FIG. 2 illustrates example components in a tracking system 200, in accordance with embodiments. Some or all of these components may be implemented by one or more processors onboard a movable object and/or a remote terminal such as described in FIG. 1. These components can be implemented by one or more processors configured to implement executable instructions stored in non-transitory storage media. The one or more processors can include ARM processors, field-programmable gate arrays (FPGAs), application-specific integrated circuit (ASIC), central processing units (CPUs), graphics processing units (GPUs), and the like. In some embodiments, some or all of the components may be implemented using hardware acceleration techniques. The tracking system 200 comprises a target identification module 202, a state estimation module 204, a target group determination module 210 and a tracking control module 216.

The target identification module 202 can be configured to receive and process images obtained from one or more imaging devices carried by a UAV, in order to identify one or more targets that can be candidates for tracking. The target identification module 202 can be configured to extract features associated with one or more targets. The one or more features may comprise one or more feature points. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature points can be detected using various algorithms (e.g., texture detection algorithm) which may extract one or more feature points from image data. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc.).

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

In some embodiments, a feature point may comprise one or more non-salient features. As used herein, non-salient features may refer to non-salient regions or non-distinct (e.g., non-recognizable) objects within an image. Non-salient features may refer to elements within an image that are unlikely to stand out or catch attention of a human observer. Examples of non-salient features may include individual pixels or groups of pixels that are non-distinct or non-identifiable to a viewer, when viewed outside of the context of their surrounding pixels.

In some alternative embodiments, a feature point may comprise one or more salient features. Salient features may refer to salient regions or distinct (e.g., recognizable) objects within an image. As used herein, salient features may refer to salient regions or distinct (e.g., recognizable) objects within an image. Salient features may refer to elements within an image that are likely to stand out or catch attention of a human observer. A salient feature may have semantic meaning. Salient features may refer to elements that may be identified consistently under computer vision processes. A salient feature may refer to animate objects, inanimate objects, landmarks, marks, logos, obstacles, and the like within an image. A salient feature may be persistently observed under differing conditions. For example, a salient feature may be persistently identified (e.g., by a human observer or by computer programs) in images acquired from different points of view, during different times of the day, under different lighting conditions, under different weather conditions, under different image acquisition settings (e.g., different gain, exposure, etc.), and the like. For example, salient features may include humans, animals, faces, bodies, structures, buildings, vehicles, planes, signs, and the like.

Salient features may be identified or determined using any existing saliency calculating methods. For example, salient features may be identified by contrast based filtering (e.g., color, intensity, orientation, size, motion, depth based, etc.), using a spectral residual approach, via frequency-tuned salient region detection, via a binarized normed gradients for objectness estimation, using a context-aware top down approach, by measuring visual saliency by site entropy rate, and the like. For example, salient features may be identified in a saliency map that is generated by subjecting one or more images to contrast based filtering (e.g., color, intensity, orientation, etc). A saliency map may represent areas with feature contrasts. A saliency map may be a predictor where people will look. A saliency map may comprise a spatial heat map representation of features or fixations. For example, in a saliency map, salient regions may have a higher luminance contrast, color contrast, edge content, intensities, etc than non-salient regions. In some embodiments, salient features may be identified using object recognition algorithms (e.g., feature based methods, appearance based methods, etc). Optionally, one or more objects or types of patterns, objects, figures, colors, logos, outlines, etc may be pre-stored as possible salient features. An image may be analyzed to identify salient features that are pre-stored (e.g., an object or types of objects). The pre-stored salient features may be updated. Alternatively, salient features may not need to be pre-stored. Salient features may be recognized on a real time basis independent to pre-stored information.

In some embodiments, image segmentation techniques may be applied to an image to partition the image into a set of segments that collectively cover the entire image or to extract a set of contours. Pixels in the same region are similar with respect to a certain characteristic, such as color, intensity, texture, and the like; while adjacent regions are different with respect the same characteristic. In some embodiments, image segmentation can include detecting and segmenting salient regions, so as to retain salient target regions. For example, a saliency map may be generated using machine learning techniques (e.g., neural networks, deep learning).

In some embodiments, the target identification module 202 can be configured to detect and classify objects in the images. Object detection may be based on features extracted using techniques described herein. Each of a different type or category of objects be associated with a different set of features or a different appearance model that helps to classify and thereby distinguish objects. For example, human faces, pedestrians, and vehicles may each have a unique set of features (e.g., color, shape, texture, contour, size, histograms) that may be used to classify the detected objects based on their appearance. In some embodiments, the target identification module 202 may have one or more object detectors, each configured to detect certain features associated with a specific category of objects. The object detectors can include a person detector, a face detector, and/or a vehicle detector, for example. In some embodiments, object detection can be based on motion detection based on comparison between consecutive images. Each object detector may be configured to output a detection response that indicates a detection result. For example, the detection response may include a true or false indicator, where a true response indicates a presence of the object and a false response indicates an absence of the object. As another example, the detection response may include a confidence score indicative of the likelihood of detection. Any suitable object detection, object recognition, or object classification algorithms may be utilized in various embodiments.

In some embodiments, the target identification module 202 can be configured to associate the detected objects with different targets. For example, identifiers representing different targets can be assigned to detected objects across different (e.g., consecutive) image frames. If the same target is detected as objects in different frames, these objects should be assigned the same identifier. On the other hand, a detected object that is not associated with an existing target may be assigned a new identifier.

In some embodiments, a target object that has been identified (e.g., detected and/or assigned) can be associated with a tracking indicator (also referred to as a target indicator) that indicates its state (e.g., size, position) in the image frames. The images of the target object may be annotated by the tracking indicator, to distinguish the target object from other non-target objects within the image frames. The tracking indicator can indicate its position and/or size, for example, in terms of pixels or pixel coordinates. The tracking indicator can include a bounding box, for example, that substantially surrounds an image of a target object within an image. While the term bounding box is used herein to refer to a tracking indicator, it is understood that the tracking indicator is not limited to a bounding box. For example, the bounding box may be a circle, an ellipse, a polygon, or any other geometric shape. The tracking indicator can have a regular shape or an irregular shape.

In some embodiments, the attributes of the tracking indicator (e.g., bounding box size and/or position in an image) can be used to roughly represent the corresponding attributes of the associated target object (e.g., target size and/or position in the image). The attributes of the tracking indicator are also referred to as the bounding box information. The bounding box information can be used to estimate a state of the target object in the real world (e.g., in the navigation coordinate system).

The bounding box can be considered a feature associated with a target object. The image analyzer may be configured to analyze the first image frame and the second image frame to determine a change in one or more features between the first image of the target object and the second image of the target object. The one or more features may be associated with the images of the target object. The change in the one or more features may comprise a change in size and/or position of the one or more features. The one or more features may also be associated with a tracking indicator. The tracking indicator may be a box, a circle, or any other geometric shape surrounding the images of the target object within the image frames.

The one or more features may correspond to a geometrical and/or positional characteristic(s) of a bounding box. The geometrical characteristic(s) of the bounding box may, for example, correspond to a size of the bounding box within an image frame. The positional characteristic of the bounding box may correspond to a position of the bounding box within an image frame. The size and/or position of the bounding box may change as the spatial disposition between the target object and the tracking device changes. The change in spatial disposition may include a change in distance and/or orientation between the target object and the tracking device.

In some embodiments, the target identification module 202 can include an image analyzer may be configured to determine the change in size and/or position of the bounding box between the first image frame and the second image frame. The image analyzer may be further configured to provide data indicative of the change in size and/or position of the bounding box to a feedback controller (not shown). The feedback controller may be configured to adjust a movement of the tracking device to track the target object, based on the change in size and/or position of the bounding box between the first and second image frames. The feedback controller may be provided anywhere within the visual tracking system 100. For example, the feedback controller may be part of a motion controller for the tracking device. The motion controller may be located on a body of the movable object, or remote from the tracking device. For example, the motion controller may be located on a remote user terminal (not shown) that is used for controlling the tracking device. In some embodiments, the feedback controller may be configured to adjust a movement of the imaging device to track the target object, based on the change in size and/or position of the bounding box between the first and second image frames.

In some embodiments, the image data captured by the imaging device (payload 106) may be stored in a media storage (not shown) before the image data is provided to the image analyzer. The image analyzer may be configured to receive the image data directly from the media storage. In some embodiments, the image analyzer may be configured to receive image data concurrently from both the imaging device and the media storage. The media storage can be any type of storage medium capable of storing image data of a plurality of objects. As previously described, the image data may include video or still images. The video or still images may be processed and analyzed by the image analyzer, as described later in the specification. The media storage can be provided as a CD, DVD, Blu-ray disc, hard disk, magnetic tape, flash memory card/drive, solid state drive, volatile or non-volatile memory, holographic data storage, and any other type of storage medium. In some embodiments, the media storage can also be a computer capable of providing image data to the image analyzer.

As another example, the media storage can be a web server, an enterprise server, or any other type of computer server. The media storage can be computer programmed to accept requests (e.g., HTTP, or other protocols that can initiate data transmission) from the image analyzer and to serve the image analyzer with requested image data. In addition, the media storage can be a broadcasting facility, such as free-to-air, cable, satellite, and other broadcasting facility, for distributing image data. The media storage may also be a server in a data network (e.g., a cloud computing network).

In some embodiments, the media storage may be located on-board the imaging device. In some other embodiments, the media storage may be located on-board the movable object but off-board the imaging device. In some further embodiments, the media storage may be located on one or more external devices off-board the movable object and/or the imaging device. In those further embodiments, the media storage may be located on a remote controller, a ground station, a server, etc. Any arrange or combination of the above components may be contemplated. In some embodiments, the media storage may communicate with the imaging device and the movable object via a peer-to-peer network architecture. In some embodiments, the media storage may be implemented using a cloud computing architecture.

The image data may be provided in the form of image signals to the image analyzer for image processing/analysis. The image analyzer can be implemented as a software program executing in a processor and/or as hardware that analyzes the plurality of image frames to determine a change in one or more features between a plurality of images of the target object. For example, the image analyzer may be configured to analyze a first image frame and a second frame to determine a change in one or more features between a first image and a second image of the target object between consecutive or non-consecutive image frames. In some embodiments, the image analyzer may be configured to determine the change in the one or more features while at least one of the movable object, imaging device, and/or the target object is in motion. At any given moment in time, the movable object, imaging device, and/or target object may be capable of moving and/or stopping. For instance, the movable object supporting the imaging device may hover for a period of time before moving to a different location to track and/or follow the target object.

The imaging device (payload 106) and the image analyzer may be co-located in one device. For example, the image analyzer can be located within or form part of the imaging device. Conversely, the imaging device can be located within or form part of the image analyzer. Optionally, the image analyzer may be located remotely from the imaging device. For example, the image analyzer may be disposed in a remote server that is in communication with the imaging device. The image analyzer may be provided at any other type of external device (e.g., a remote controller for the movable object, an object carried by the target object, a reference location such as a base station, or a tracking device), or may be distributed on a cloud computing infrastructure.

In some embodiments, the image analyzer and the media storage for storing image data may be located on a same device. In other embodiments, the image analyzer and the media storage for storing image data may be located on different devices. The image analyzer and the media storage may communicate either via wired or wireless connections.

Still referring to FIG. 2, the state estimation module 204 can be configured to determine states of target objects in the real world. The state of an object can include its kinematic state such as position, velocity, acceleration, and/or orientation. The state can be expressed relative to any suitable reference frame or coordinate system. For example, the state of the target object can be expressed relative to a ground reference frame or any other suitable reference frame. The state of the target object may be indicated in the same coordinate system as for the UAV navigation or in a different coordinate system. In an example, the object position is indicated using coordinates in a navigation coordinate system. The navigation coordinate system may include a North-East-Down (NED) coordinate system having its origin a predetermined location on the ground (e.g., a UAV takeoff location, a ground station or remote terminal location, a home location). Alternatively, the navigation coordinate system may include an East-North-Up (ENU) coordinate system having its origin at the UAV (e.g., UAV's center of gravity).

In some embodiments, the state of an object can also relate to its appearance such as its size, shape, texture, color, and the like. In some examples changes in appearance of the tracking indicator in different images (e.g., bounding box size and/or position) can be used to represent changes of the associated target object across the different frames.

The state estimation module 204 may comprise an object state estimation module 204 and a group state estimation module 206. The object state estimation module 204 configured to determine a state of a target object (e.g., relative distance or relative angle between the target object and the tracking system), for example, based on bounding box information associated with the target object (e.g., as obtained by the target identification module 202). The group state estimation module 206 can be configured to determine a state of a target group based on the states of the target objects included in the target group.

The target group determination module 210 may be configured to determine a target group comprising one or more target objects. For instance, the target group determination module 210 may be configured to select one or more target objects from a plurality of target objects that have been identified (e.g., by the target identification module 202) based the states of the target objects, such as their proximity to each other or to a reference point. The target group determination module 210 may comprise a group initialization module 212 configured to initialize a target group and a group update module 214 configured to update the target group.

The tracking control module 216 may be configured to generate control signals for the controlling the UAV and/or the carrier so as to track a target group. The tracking may be based on a target group state such as obtained by the state estimation module 204. In some embodiments, the tracking control module 216 can comprise a feedback controller described elsewhere herein.

Figure 3:
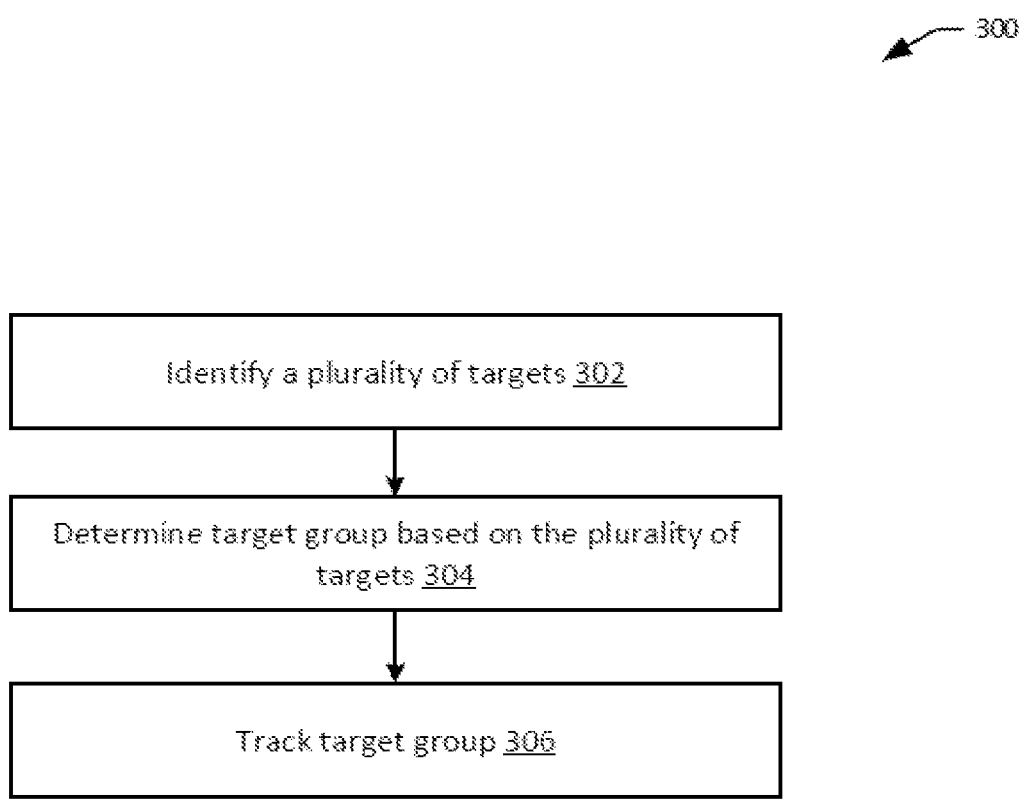
FIG. 3 illustrates an exemplary process for implementing multi-target tracking, in accordance with embodiments.

FIG. 3 illustrates an exemplary process 300 for implementing multi-target tracking, in accordance with embodiments. Some or all aspects of the process 300 (or any other processes described herein, or variations and/or combinations thereof) may be performed by one or more processors onboard a movable object (e.g., a UAV) and at a remote terminal. Some or all aspects of the process 300 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 302, a plurality of targets are identified. In some embodiments, the plurality of targets can be identified based on images obtained one or more imaging devices carried by a movable object such as a UAV. The imaging device(s) may be coupled rigidly to the UAV. Or, the imaging device(s) may be coupled to the UAV via a carrier that is configured to allow the imaging device(s) to move relative to the UAV. Alternatively or additionally, in some embodiments, the plurality of targets may be identified using other sensors such as GPS sensors, lidar, ultra wideband (UWB) radar sensors, millimeter-wave radar sensor, and the like. In some embodiments, the identified targets may be indicated by tracking indicators such as bounding boxes.

At block 304, a target group can be determined based on the plurality of targets. In particular, the target group comprises one or more targets can be selected from the plurality of identified targets. The one or more targets may be selected based on a target state associated with each of the one or more targets. For example, the targets for the target group may be selected based on their proximity to each other or to a predetermined reference point (e.g., image center). Alternatively, the one or more targets may be selected based on a primary target. Targets close to the primary target may be selected in the target group.

In some embodiments, the state of the targets can be determined based at least in part on bounding box information. For example, a relative distance vector between the tracking system and a target may be determined based at least in part on bounding box information, the field of view (FOV) of the imaging device, the UAV state (e.g., altitude), and/or the camera orientation. Given the position of the tracking system (which may be determined using any suitable position sensors such as GPS sensors), the position of the target can thus be determined based on the position of the tracking system and the relative distance vector.

At block 306, the target group can be tracked. The tracking can be based on a target group state associated with the target group. The target group state can be determined based at least in part on the target state of each of the one or more targets in the target group. For example, a position or velocity of the target group may be calculated as an average or weight average of the position or velocity of each target in the group. The state of a target or the state of a target group can include a kinematic state in any suitable coordinate system (e.g., image coordinate system or navigation coordinate system) such as a position, a velocity, an acceleration, or an orientation. The state of the target or the state of the target group can also include its type or appearance such as its size, shape, color, texture, and the like.

Tracking the target group can comprise generating control signals for an actuation system associated with the UAV and/or the carrier. Tracking the target group can mean maintaining the target group at or near a predetermined position and/or size in images obtained from the imaging device(s). Alternatively, tracking the target group can mean maintaining a predetermined spatial relationship (e.g., distance) between the tracking system and target group.

In some embodiments, the target group can be indicated by a tracking indicator such as a bounding box. A change in size and/or position of the bounding box between image frames can be detected by analyzing the images. Based on the change in size and/or position of the bounding box, a change in distance between the target group and the tracking device or tracking system (e.g., UAV and/or imaging device) can be calculated. The change in distance may have multiple components such as along two different directions. A controller can be configured to generate control signals for controlling movement of the tracking system based on change in distance so as to reduce or minimize the effect of the change. For example, an expected velocity of the tracking system may be determined based on the change in distance. The expected velocity may comprise two or more velocity components along two or more different directions. The expected velocity components may be used by a feedback controller to adjust corresponding velocity components of the UAV and/or to adjust rotation of the carrier along two or more axes. The feedback controller may be a proportional-integral-derivative (PID) controller.

For example, the controller may direct the tracking device to move towards or away from the target object (now target group), depending on the change in distance between the tracking device and the target object, and also the directions in which the change in distance is generated. The motion controller may also direct the tracking device to change its orientation relative to the target object, depending on the change in position of the bounding box between image frames. The change in orientation of the tracking device may include a rotational motion of the tracking device about a yaw, roll, and/or pitch axis. In some embodiments, the motion controller can simultaneously control translation and rotation of the tracking device relative to the target object, based on changes in the size and/or position of the bounding box between different image frames.

Figure 4:
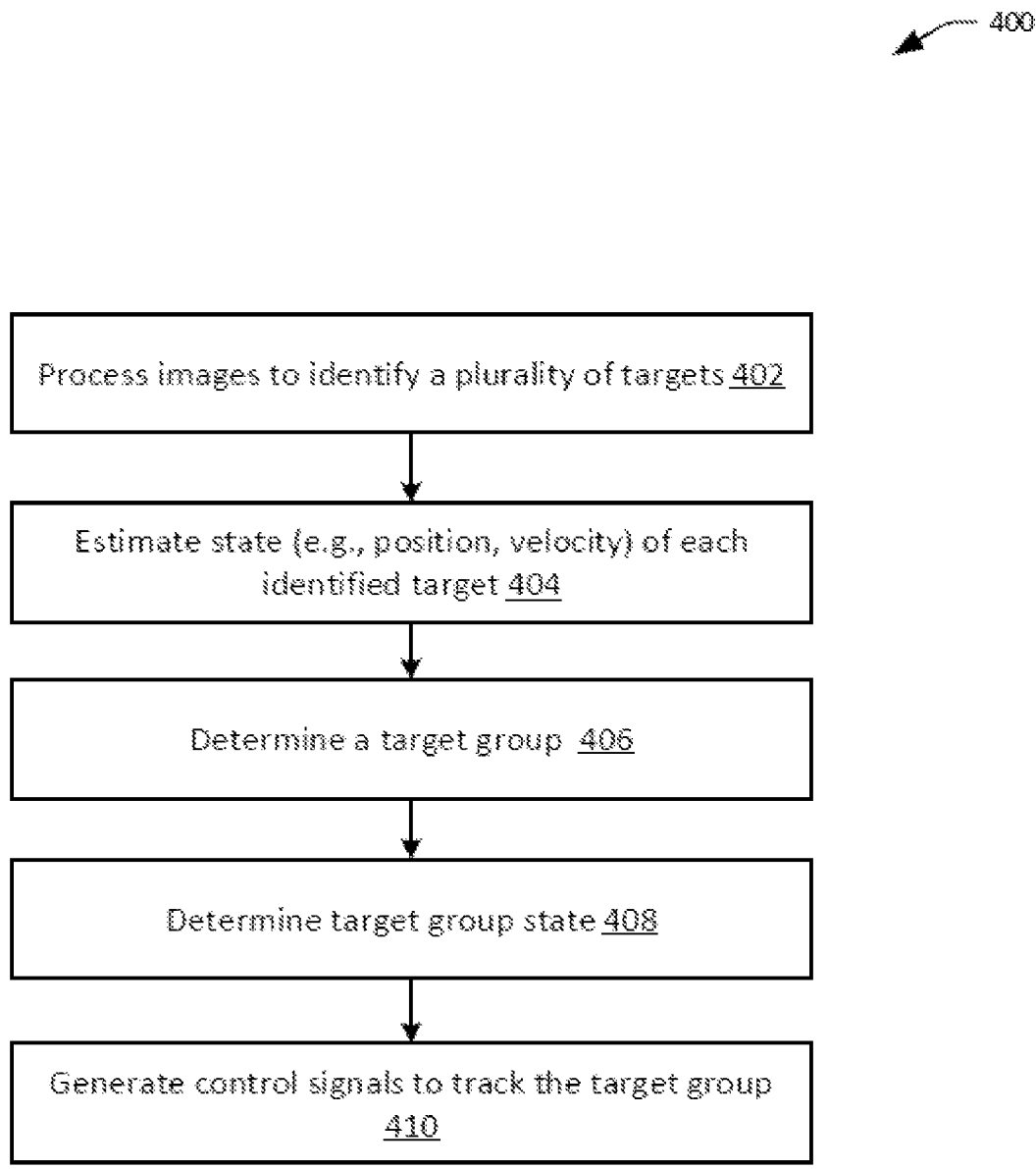
FIG. 4 illustrates an exemplary process for implementing multi-target tracking, in accordance with embodiments.

FIG. 4 illustrates an exemplary process 400 for implementing multi-target tracking, in accordance with embodiments.

At block 402, one or more images can be processed to identify a plurality of targets. The images can be obtained by one or more imaging devices carried by a UAV. The images can comprise still images or video frames. The imaging devices can be carried by the UAV via a carrier that permits relative movement between the imaging devices and the UAV.

In some embodiments, identifying the targets can include detecting target objects in the images based on features specific to certain types of targets. The target features can be related to color, brightness, size, shape, texture, and the like. Examples of types of target objects can include static object, moving objects, humans, vehicles, buildings, plants, and the like. In some embodiments, the types of objects to be detected can be set by default or specified by a user. For instance, a user may specify the type(s) of objects to be tracked via a remote terminal before tracking starts. Alternatively or additionally, user may dynamically specify or update the type(s) of objects to be tracked via a remote terminal during the tracking of objects. For instance, the remote terminal may allow the user to specify a "human tracking" mode where humans are tracked, or a "vehicle tracking" mode where vehicles are tracked. As another example, the user may specify or select the characteristics of the target from a list of target characteristics. In other embodiments, the type of objects to be detected and tracked may be determined by an automated or a semi-automated process, for example, based on machine learning techniques. For instance, an automated process may be configured to automatically determine the type(s) of targets to track based on a current time, a current location, or an environment of the UAV. In some other examples, the target types may be determined based on user profile, previous tracking history, configuration of the UAV and/or imaging device(s), sensing data obtained by UAV sensors, and the like. In another example, the user may select a target to be tracked via a user interface on the remote terminal and characteristics about the target may be automatically determined and used as a template for detecting and tracking other similar targets. In other examples, a user may be allowed to confirm, reject, or update the target types generated by an automated process.

In some embodiments, the target type information may be transmitted from the remote terminal to the UAV, so that processors onboard the UAV can use the target type information to detect target objects in the images captured by onboard imaging device(s). Alternatively, the target information may be used by processors at the remote terminal or processors at the UAV to identify targets in images received from the UAV.

Based on the types of targets, the images obtained from the imaging devices can be processed to detect target objects. For example, various features (e.g., points, edges, blobs, salient regions) can be extracted from the images and compared with target features to determine a match. As another example, moving objects can be determined by comparing adjacent images. In some embodiments, one or more object detectors may be used, each configured to detect a certain type of objects. Detection results (e.g., confidence scores) from the detectors may be analyzed (e.g., ranked, filtered, correlated) to determine the detected objects.

Various object detection algorithms can be used. For example, the object detection algorithms can be based on object models, object templates and features, and genetics algorithms. Example object detection techniques may include edge matching, greyscale or gradient matching, divide-and-conquer search, interpretation trees, hypothesis and tests, invariants, scale-invariant feature transform (SIFT), speeded up robust features (SURF), and the like.

In some embodiments, identifying the targets includes associating detected objects across different frames. For example, identifiers representing different targets can be assigned to detected objects across different (e.g., consecutive) image frames. For example, for each of the plurality of objects identified in a given frame, if the object has been previously identified in a previous frame, then the object can be assigned the same identifier as the previously identified object; otherwise, the object may be assigned a new identifier.

A target object that has been identified (e.g., detected and/or assigned) can be associated with a tracking indicator (bounding box) that indicates its attributes (e.g., position and/or size) within the image frames. The bounding box information can be used to estimate a state of the target object, as discussed herein. A change in bounding box information can be used to detect changes in the object state and generate control signals for continued tracking of the objects, as discussed herein.

At block 404, a state of each of the identified target objects in an image can be determined. The state of the target object can include a kinematic state including position, velocity (angular or linear), acceleration (angular or linear), and/or orientation.

A position of each target object may be determined based at least in part on the bounding box information. In some embodiments, the position determination is additionally based on a UAV state, a state of the imaging device/carrier, one or more configuration parameters of the imaging device, and/or sensing data. For example, the position of the target object in a navigation coordinate system (navigation coordinates of target) can be determined based on the position of the tracking system in the navigation coordinate system (e.g., navigation coordinates of the UAV and/or imaging device) and the position of the target object relative to the tracking system. The navigation coordinates of the tracking system may be determined based on sensing data from any combination of sensors such as GPS sensors, vision or visual sensors (e.g., stereo-vision sensors), lidar sensors, ultrasound sensors, laser sensors, magnetometers, and the like. For example, sensor fusion techniques can be used to determine position of the tracking system based on two or more types of sensors (e.g., GPS sensor and stereo-vision sensor). The position of the target object relative to the tracking system can be determined based on a relative distance and/or a relative angle between the tracking system and the target object.

The relative distance between a tracking system (e.g., UAV and/or the imaging device) and the target object can be calculated based on bounding box information of target object (e.g., pixel position and/or size). In some embodiments, the relative distance may be calculated based additionally on UAV state information (e.g., altitude), a state of the imaging device/carrier (e.g., camera or carrier attitude), and/or one or more configuration parameters of the imaging device (e.g., field of view (FOV), focal length).

A relative angle between the tracking system and the target object can be calculated based on sensing data (e.g., GPS and/or magnetometer data). Alternatively, the relative angle between the tracking system and the target object can be calculated based on bounding box information. In some embodiments, the relative angle may be calculated based additionally on UAV state information (e.g., altitude), a state of the imaging device/carrier (e.g., camera or carrier attitude), and/or one or more configuration parameters of the imaging device (e.g., field of view (FOV), focal length). Using the yaw angle as an example, given the pixel coordinates of the bounding box and camera parameters (e.g., FOV, focal length), a relative angle $\alpha$ between target and the optical axis of the imaging device can be determined. If there is a relative yaw angle $\text{Yaw}_{gimbal}$ between the imaging device and the UAV, then such the relative angle $\text{Yaw}_{target2drone}$ between the target and the UAV can be determined: $\text{Yaw}_{target2drone} = \text{Yaw}_{gimbal} + \alpha$.

In some embodiments, a velocity of each target object may be determined based at least in part on bounding box information. For instance, the velocity of a target object can be estimated based on its positional change over time. Example techniques for determining relative distance, position, and/or velocity based on bounding box information are described International Application No. PCT/CN2016/074693, filed Feb. 26, 2016, the entire content of which is incorporated by reference herein.

In some embodiments, noise filters may be applied to remove noise from the target state data. Various noises may lead to inaccurate estimation of target state (e.g., position, velocity). Such noises can include noise in bounding box information (e.g., where the bounding box is shifted or misaligned relative to the actual target) and measurement noise, for example. To remove such noise, any suitable noise filters may be applied when determining target state (e.g., position, velocity). Such filters may include one or more first order filters, second order filters, higher order filters, Kalman filters, extended Kalman filters, Butterworth filters, Parks-McClellan filter, and the like.

In some embodiments, different types of filters may be applied based on the types of target being tracked. In some embodiments, different state functions (e.g., used in a prediction step of a Kalman filter) may be designed for different types of the target objects. The different state function may incorporate different dynamic model or movement characteristics for different target types. In an example, a first model may be used for cars and bikes, and a second different model may be used for pedestrians (e.g., a uniform acceleration model). The types or categories of the targets objects may be determined as described in block 402 above.

In some embodiments, sensing data from one or more sensors may be fused with the state estimation described above to improve the results. In some embodiments, instead of relying on image data as described in blocks 402 and 404, sensing data from one or more other sensors may be used to determine target state. For example, such determination may be based on GPS signals, ultra wideband (UWB) technologies, lidar, stereo-vision, or millimeter-wave radar technologies. In some embodiments, the target objects to be tracked may actively transmit sensing data that can used to determine target state. For instance, sensing data from inertial measurement units (IMUs) or magnetometers located on a target object may be obtained and used to determine an orientation of the target object.

At block 406, a target group comprising multiple targets can be determined. The target group as a whole may be tracked. In some embodiments, target objects within the target group may be selected based at least in part on the respective state of the target objects. This may include the state of the target object in any suitable coordinate system, such as in the two-dimensional (2D) image coordinate system or in the three-dimensional (3D) navigation coordinate system. The state of the target object in the image coordinate system can include a position, size, and/or a motion vector. For example, the position of a target object can be represented by pixel coordinates of a center of the target object in the image coordinate system. In some examples, the pixel coordinates of a center of a bounding box for the target object may be used as its position coordinates. The state of the target object in the navigation coordinate system, including a position, velocity, acceleration, and/or orientation, can be determined in accordance with techniques described in block 404 of FIG. 4 above.

Figure 7:
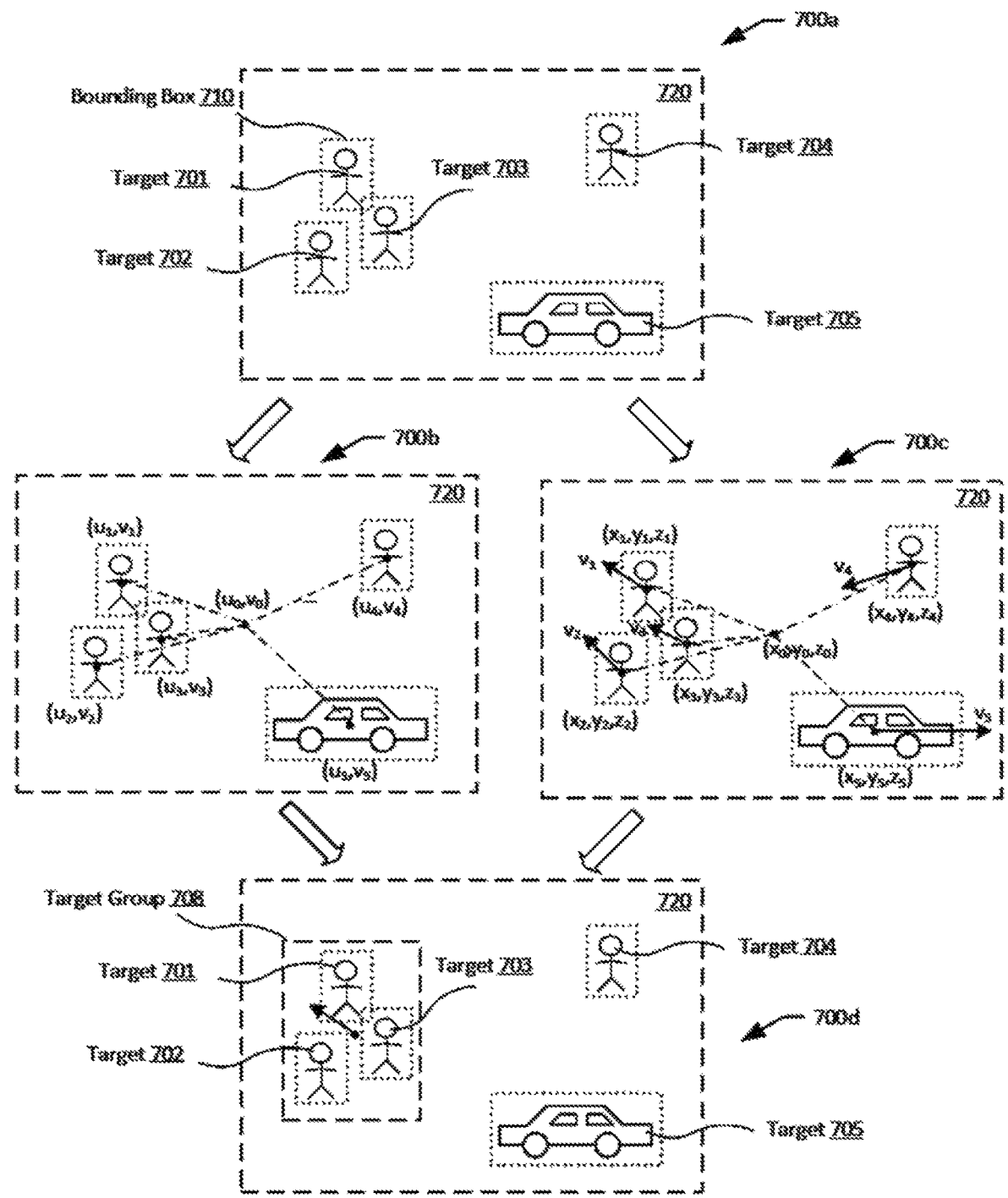
FIG. 7 illustrates some exemplary processes for target group selection, in accordance with embodiments.

FIG. 7 illustrates some exemplary processes for target group selection, in accordance with embodiments. As illustrated in 700a, target objects 701, 702, 703, 704 and 705 have been identified in the image 720. The target objects may be indicated by bounding boxes 710 to distinguish from other non-target objects (not shown) in the image.

As illustrated in 700b, a target group comprising one or more objects can be determined based at least in part on the state of the target objects in the image coordinate system. The determination can be based on the positions of the target objects. For example, a distance between a reference point in the image coordinate system and each of the target objects can be determined based on the position coordinates of the reference point, $(u_0, v_0)$, and the pixel coordinates of the target objects, e.g., $(u_1, v_1)$, $(u_2, v_2)$, $(u_3, v_3)$, $(u_4, v_4)$, $(u_5, v_5)$, for target objects 701, 702, 703, 704, and 705, respectively. The respective distance for each target object can be compared with a predetermined threshold distance, d, and those target objects with a distance less than or equal to d may be selected in the target group. In alternative embodiments, only those target objects with a distance greater than or equal to d may be selected in the target group.

In various embodiments, the reference point can be the image center, a position of a reference object (e.g., a landmark building), or any other predetermined point in the image coordinate system. The reference point may be set by default by the system and/or configurable by a user or system administrator. For example, a user may be allowed to specify the reference point using a remote terminal.

Additionally or alternatively, target group selection may be based on positional change of the target objects. For example, the positions of the target objects may shift between adjacent images. The positional shift may be represented by a motion vector in the image coordinate system. The motion vector can indicate a direction at which the target object t is moving (target direction) and/or a magnitude of the movement (target speed) of the positional change. The components of the motion vector for each target object can be compared with components of a reference motion vector that indicates a reference direction and/or a reference magnitude. The group selection may be based on the comparison results. For instance, in some embodiments, if the deviation between the target direction and the reference direction is less than a threshold angle, and/or if the target magnitude is less than or equal to the reference speed, then the target object is selected to be in the target group.

As illustrated in 700c, a target group comprising one or more objects can be determined based at least in part on the state of the target objects in a 3D coordinate system such as the navigation coordinate system, such as determined in block 404 of FIG. 4 discussed herein. The determination can be based on the positions of the target objects. For example, a distance between a reference point in the navigation coordinate system and each of the target objects can be determined based on the position coordinates of the reference point, $(x_0, y_0, z_0)$, and the navigation coordinates of the target objects, e.g., $(x_1, y_1, z_1)$, $(x_2, y_2, z_2)$, $(x_3, y_3, z_3)$, $(x_4, y_4, z_4)$, $(x_5, y_5, z_5)$, for target objects 701, 702, 703, 704, and 705, respectively. The respective distance for each target object can be compared with a predetermined threshold distance, d, and those target objects with a distance less than or equal to d may be selected in the target group. In alternative embodiments, only those target objects with a distance greater than or equal to d may be selected in the target group.

In various embodiments, the reference point may correspond to a point in the image center, a position of a reference object (e.g., a landmark building), a home point, a tracking device position, a user position, a remote terminal position, or any other predetermined point in the navigation coordinate system. For instance, objects within certain distance from a certain building, or from a user may be tracked. As another example, objects that are closest to the tracking system may be selected for tracking. The position of the building, the user or the tracking system may be determined by one or more position sensors such as GPS sensors. The reference point may be set by default by the system and/or configurable by a user or system administrator. For example, a user may be allowed to specify the reference point using a remote terminal.

Additionally or alternatively, target group selection may be based on a velocity or motion vector of the target objects in the navigation coordinate system. The velocity of a target object may be determined as described in block 404 of FIG. 4. The velocity can indicate a direction at which the target object is moving (target direction) and/or a magnitude of the movement (target speed) in navigation coordinate system. The components of the velocity for each target object can be compared with the components of a reference velocity that indicates a reference direction and/or a reference speed. The group selection may be based on the comparison results. For instance, in some embodiments, if the deviation between the target direction and the reference direction is less than a threshold angle, and/or if the target speed is less than or equal to the reference speed, then the target object is selected to be in the target group.

Additionally or alternatively, target group selection may be based on other state information such as target size. The size of a target object in the image coordinate system may be represented by the dimensions of or the size of an area covered by its bounding box (e.g., pixel width multiplied by pixel height). The size of the target object in the navigation coordinate system may be calculated based on the size of the target object in the image coordinate system according to geometric relationship between the target and the imaging device. In an example, only the target objects with a size that is greater than or equal to a threshold size may be selected in the target group. In another example, only the target objects with a size that is less than or equal to a threshold size may be selected in the target group.

While the above embodiments are discussed with respect to the image coordinate system and navigation coordinate system, it is understood that such coordinate systems are provided for illustrative purposes only and are not intended to be limiting. In various embodiments, target group selection can be based on states of the target objects in any suitable reference frame or coordinate system.

Based on factors such as those discussed herein, a target group comprising target objects can be determined. For example, as illustrated in 700d, target objects 701, 702 and 703 may be selected to be part of a target group 708 based on some or all of the factors discussed above. A bounding box for the target group 708 may or may not be shown on the image 720 to indicate the target group. A state of the target group (e.g., 3D position and/or velocity in the navigation coordinate system or 2D position/velocity in the image coordinate system) may be calculated based on the member states, as described in more detail herein.

In some embodiments, one or more of the target objects may be determined to be primary target objects (also referred to as primary targets or primary objects). The primary targets may always be tracked and hence are always in a target group. The rest of the target objects (secondary target objects) may be included in or excluded from the target group based on their relationship to the primary target objects.

Figure 8:
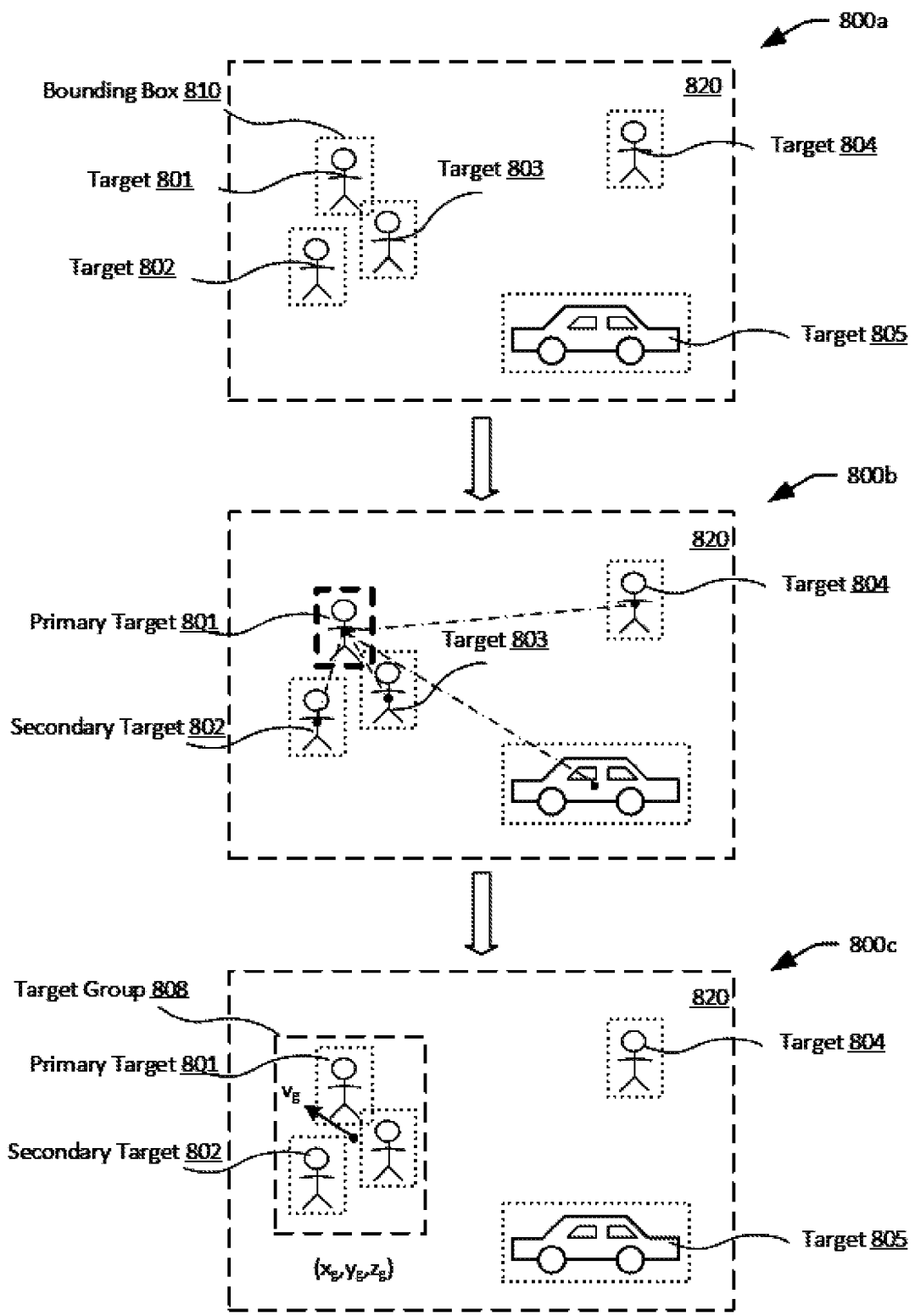
FIG. 8 illustrates an exemplary process for target group selection, in accordance with embodiments.

FIG. 8 illustrates another exemplary process for target group selection, in accordance with embodiments. As illustrated, a target group may be determined based at least in part on a state of a primary target. As illustrated in 800a, target objects 801, 802, 803, 804 and 805 have been identified in the image 820. The target objects may be indicated by bounding boxes 810 to distinguish from other non-target objects (not shown) in the image.

As illustrated in 800b, target 801 may be a primary target which will be included in the target group, while the remaining target objects (e.g., target 802) may be non-primary or secondary objects which may or may not be included in the target group. In some embodiments, the group selection may be based on a spatial relationship between the primary target and the secondary targets. For instance, a distance between the primary target and a secondary target may be calculated based on their position coordinates. Only those targets falling within a predetermined threshold distance from the primary target (e.g., with a distance less than or equal to a predetermined distance threshold) may be included in the target group 808. Besides position of the primary target, other state information of the primary target may also be used to select members for the target group. For instance, a moving direction of a secondary target may be compared with a moving direction of a primary target. If the difference between the two directions is less than or equal to a predetermined threshold value, then the secondary target is selected in the target group. Alternatively or additionally, a speed of a secondary target may be compared with a speed of a primary target. If the difference between the two speeds is less than or equal to a predetermined threshold value, then the secondary target is selected in the target group. For example, as shown in 800c, secondary target objects 802 and 803 are selected to be in the same target group 808 based on their relationship with the primary target object 801.

In some embodiments, more than one target in a frame may be determined to be the primary targets, which are included a target group. In such embodiments, the state of the multiple primary targets as a whole can be calculated based on the states of the individual primary targets. For instance, the state (e.g., position, velocity) of the multiple primary targets can be an average of the states of the individual primary targets. Then, the state of the multiple primary targets can be used to select secondary target to be included in the target group.

In various embodiments, primary target objects can be determined in various ways. For example, a user may designate certain target objects as primary targets using a user interface (e.g., touchscreen) on a remote terminal. In some other examples, a target may be automatically determined to be a primary target, e.g., based on machine learning techniques. A target object may be set to become a primary target based on its state. For example, a target that is closest to a reference point (e.g., image center) may be considered a primary target. As another example, a target that has moves at a certain speed (e.g., greater than or equal to a minimum threshold speed, and/or less than or equal to a maximum threshold speed) may be considered a primary target.

In some embodiments, a primary target can be determined based on its appearance in the images (e.g., color, brightness, size). For instance, a larger object may be more likely to become a primary target than a smaller object. As another example, targets with certain colors (e.g., red sweater) or brightness may be considered primary targets. As another example, facial recognition algorithms may be applied to the images to identify certain targets (e.g., leaders) as primary targets. As another example, gesture recognition algorithms may be applied to the images to identify targets making certain predefined gestures as the primary targets.

In some embodiments, a primary target can be determined based on the detection of certain object or identifier associated with the target. Example such an object can include a visual marker (e.g., a fiducial marker), a tag configured to emit electromagnetic waves (e.g., radio, infrared, visible light), and the like. The objects and/or transmission thereof may be detected to identify the primary targets.

In some embodiments, the primary target may be selected based on weight values associated with the target objects. The weight value of a target object may indicate its importance. A target object with a higher weight value may be more likely to be selected as the primary target. A target object may be assigned a weight value based on any of the previously discussed factors such as its state (e.g., position, velocity, acceleration, orientation, type, appearance).

Still referring to block 406 of FIG. 4. In some embodiments, target group determination may be based on the target types of the target objects. For example, in one example, only pedestrians are selected to be in a target group. In another example, only bikers are selected to be in the target group. In another example, more than one type of targets may be selected in the target group. The type(s) of targets for the target group may be determined based on user input. For example, a user may specify, via a remote terminal, the types of targets to be tracked as a group. Or, the user may select a tracking mode that indicates the types to be tracked.

Alternatively or additionally, the type of targets for the target group to be tracked (tracking type) may be determined automatically based on a current environment, a state of the UAV, a user profile, a tracking history, and the like. For example, in an urban environment, the tracking type may be set to be pedestrians. In a wild environment, the tracking type may be animals (e.g., herds of buffalos). As another example, the tracking type may vary depending on an altitude of the UAV. At a higher altitude, the tracking type may be set to larger and/or faster moving objects such as vehicles. At a lower altitude, the tracking type may be set to smaller and/or slower moving objects such as pedestrians. As another example, the tracking type may vary depending on a user's profile, demographic information, and/or tracking history. For example, the tracking type may be set based on a user's age, occupation, address, preferences, and the like. The tracking type may be set to be the most recently tracked target type or the most frequently tracked target type.

In some embodiments, the selection of a target group may be based on weight values associated with the target objects. The weight value of a target object may indicate its importance. A target object with a higher weight value may be more likely to be added to the target group. A target object may be assigned a weight value based on any of the factors discussed herein such as its state (e.g., position, velocity, acceleration, orientation), type, appearance, environment information, user input, etc.

In various embodiments, any combinations of the above-discussed factors (e.g., position, velocity, size, type, environment, weight values) may be used in conjunction (AND) or in disjunction (OR) to select members for the target group.

The number of targets in a target group may be limited or unlimited. In some embodiments, the number of targets in a target group may not be less than a threshold minimum number or percentage, and/or the number of targets in a target group may not be more than a threshold maximum number or percentage. For example, in weight-based target group selection, the targets may be ranked according to their weight values, and no more than N top ranking target objects may be selected for the target group, where N is the threshold maximum number. In various embodiments, these threshold values may be set by default, set by a user, or determined automatically.

In some embodiments, determining a target group comprises updating an existing target group. For example, the target group may be updated according to methods discussed in connection with block 504 of FIG. 5.

Still referring to FIG. 4, at block 408, a state of the target group is determined. The determination of the target group state can be based on the states associated with member targets of the target group. For example, the target group state can be calculated as an average or a mean of the member states. For instance, the position coordinates of the target group can be calculated by averaging the position coordinates of the group members. Other state information of the target group (e.g., velocity, acceleration, orientation) can be calculated in a similar fashion. In some embodiments, each target in the target group may be assigned a weight value (e.g., a number no less than zero and no more than one), which may be used to calculate the target group state as a weighted average of the individual target states. The weight value may be used to indicate an importance of a target. A higher weight value may indicate greater importance. For instance, the weight value associated with a primary target may be higher than a weight associated with a non-primary target in the group. In some embodiments, the weight value of a target may be determined based on one or more of the factors discussed herein, such as target state (e.g., comparison to a reference point or threshold value), appearance, type, environment, and the like. In some embodiments, the weight values for calculating target group state may or may not be the same as the weight values for selecting the target group.

At block 410, control signals may be generated based at least in part on the target group state, so as to track the target group. Once multiple targets are reduced to a target group, the target group as a whole can be treated as a single target for tracking purposes. For example, changes in position and/or size of the target group between images can be detected. Based on the detected changes, control signals may be generated for controlling the UAV and/or for controlling the carrier. The control signals may be configured to adjust a position, velocity, acceleration or orientation of the UAV. Alternatively or additionally, the control signals may be configured to adjust an orientation of an imaging device relative to the UAV via the carrier. The adjustment may be configured to maintain a predetermined position and/or size of the target group in the images. Alternatively, the adjustment may be configured to maintain a predetermined spatial relationship (e.g., distance) between the tracking system and target group.

Treating the target group as a single target object, various tracking methods may be applied to track the target group. Example tracking techniques include those described in International Application No. PCT/CN2016/074693 and/or PCT PCT/CN2014/083315, both of which are included herein by reference.

Figure 5:
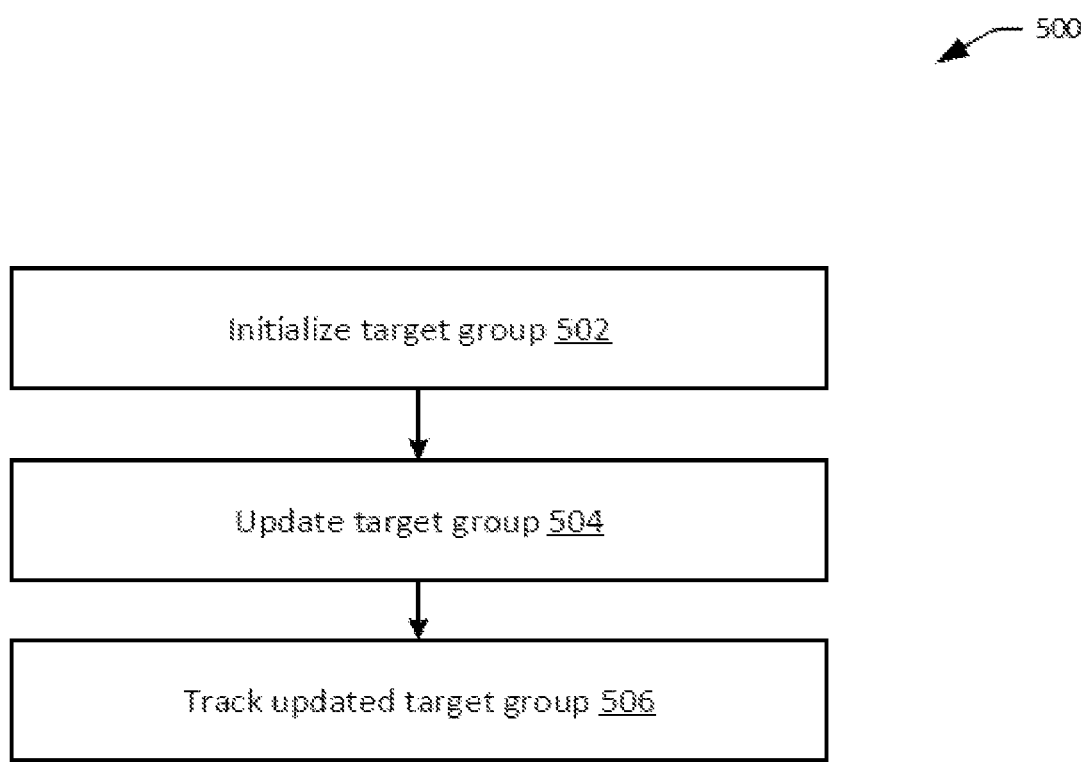
FIG. 5 illustrates another exemplary process for implementing multi-target tracking, in accordance with embodiments.

FIG. 5 illustrates another exemplary process 500 for implementing multi-target tracking, in accordance with embodiments.

At block 502, a target group can be initialized. The target group can comprise one or more target objects. The initialized target group may be tracked using the methods described herein. The one or more objects can be identified based on one or more images using object detection or image matching algorithms such as described herein. In some embodiments, initialization of a target group may be performed based on user input. Various methods for target group determination that are discussed herein can be used to initialize the target group. For example, a user operating a remote terminal can select one or more target objects in an image displayed on the remote terminal. Information about the user selection can then be transmitted to the UAV. In some other embodiments, the initialization of the target group can be performed automatically based on the states of the target objects (e.g., in the image coordinate system or in the navigation coordinate system), reference objects, target types, primary targets, environment, historic data, and the like. In some examples, machine learning algorithms may be used to initialize the target group. In some other embodiments, automated initialization and manual initialization may be combined to initialize the target group.

Figure 10:
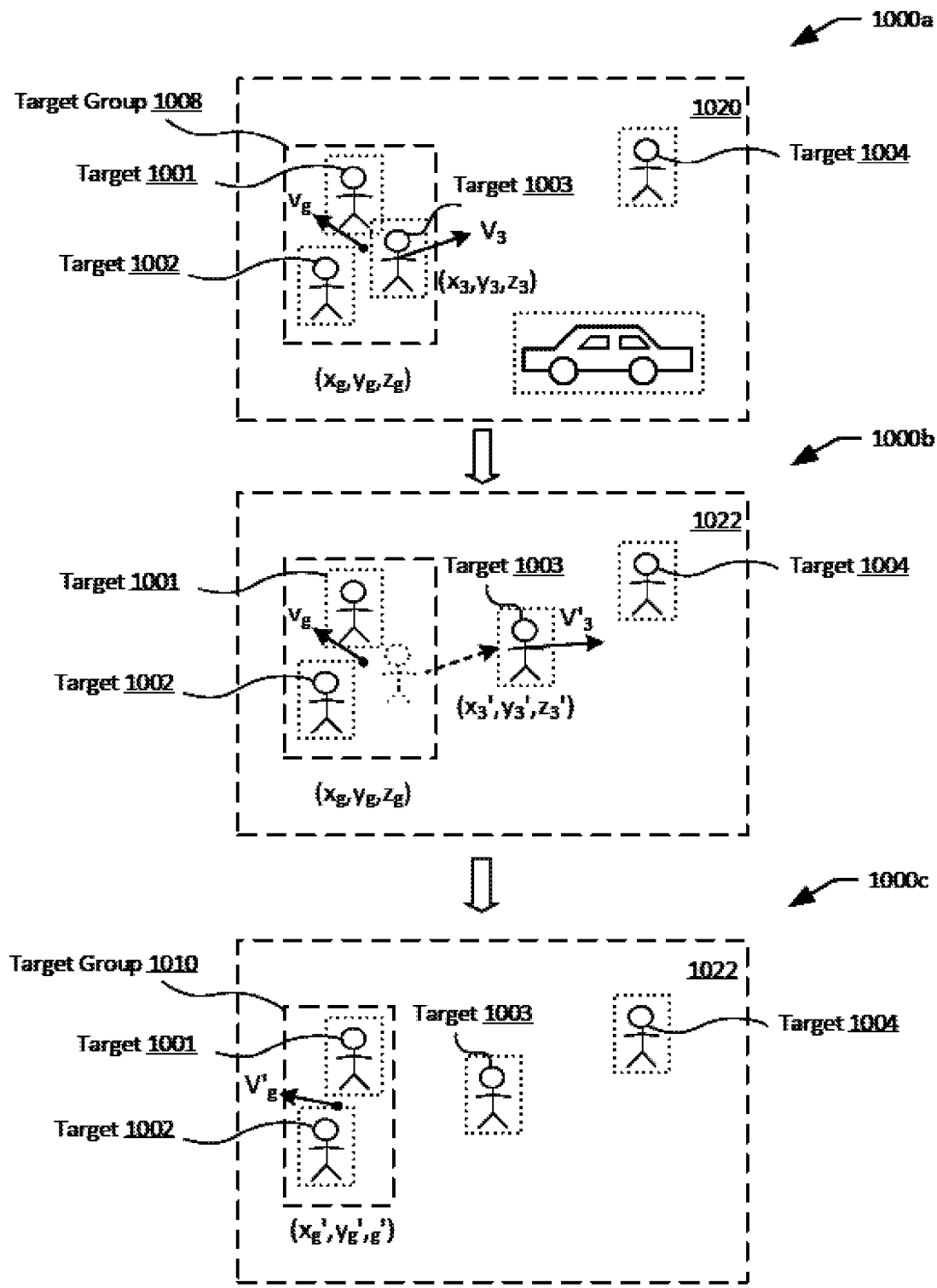
FIG. 10 illustrates removing a target object from a target group, in accordance with embodiments.
Figure 11:
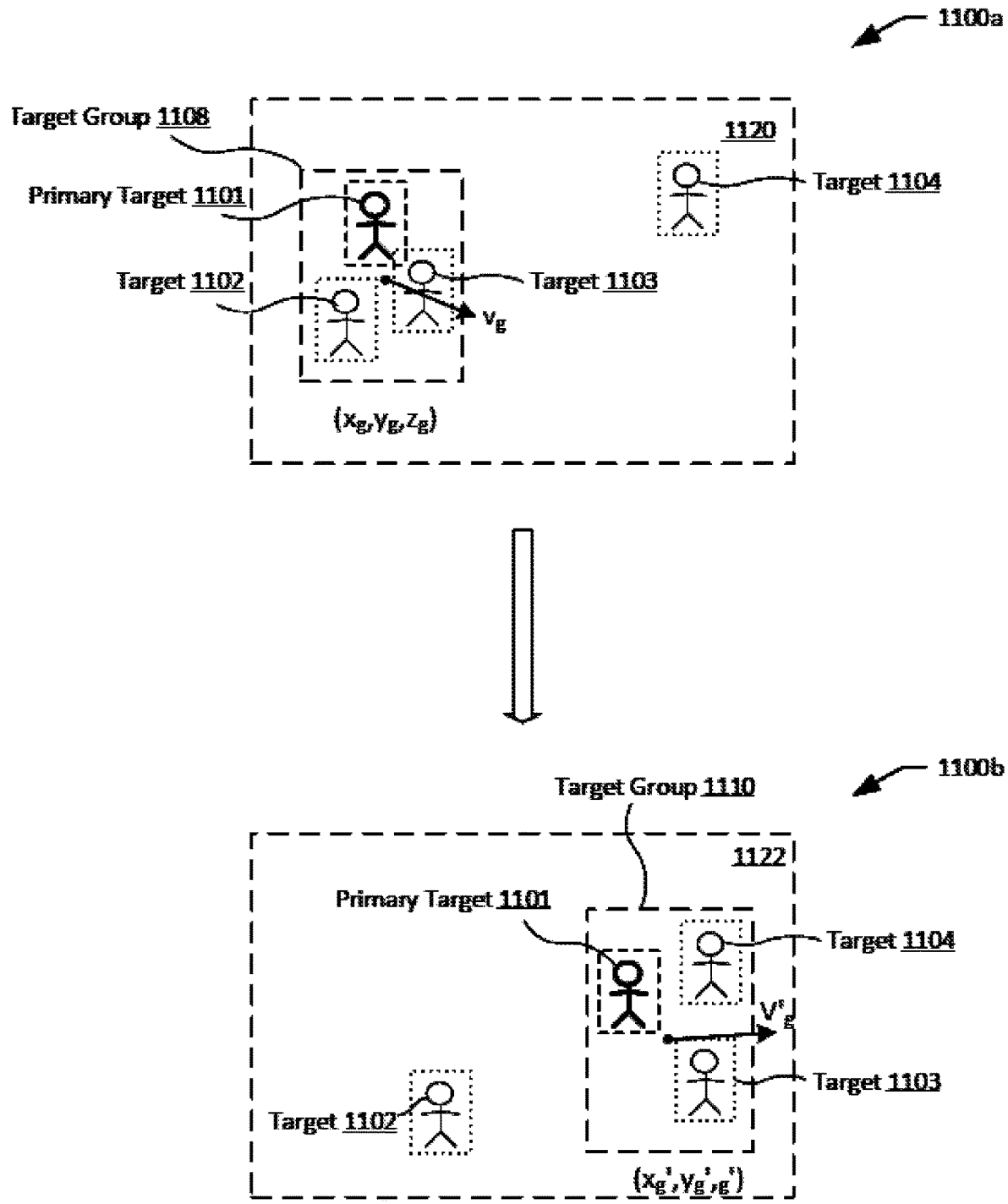
FIG. 11 illustrates updating a target group based on a primary target, in accordance with embodiments.

At block 504, the target group can be updated. Initialization of the target group may be based on a first image. Subsequently, the target group to be tracked may need to be updated based on a second image. For instance, objects captured by the second image may be different than those captured in the first image, due to movement of the UAV, imaging device, and/or surrounding objects. Updating the target group may comprise adding or removing target objects, such as illustrated in FIGS. 9-11.

Figure 9:
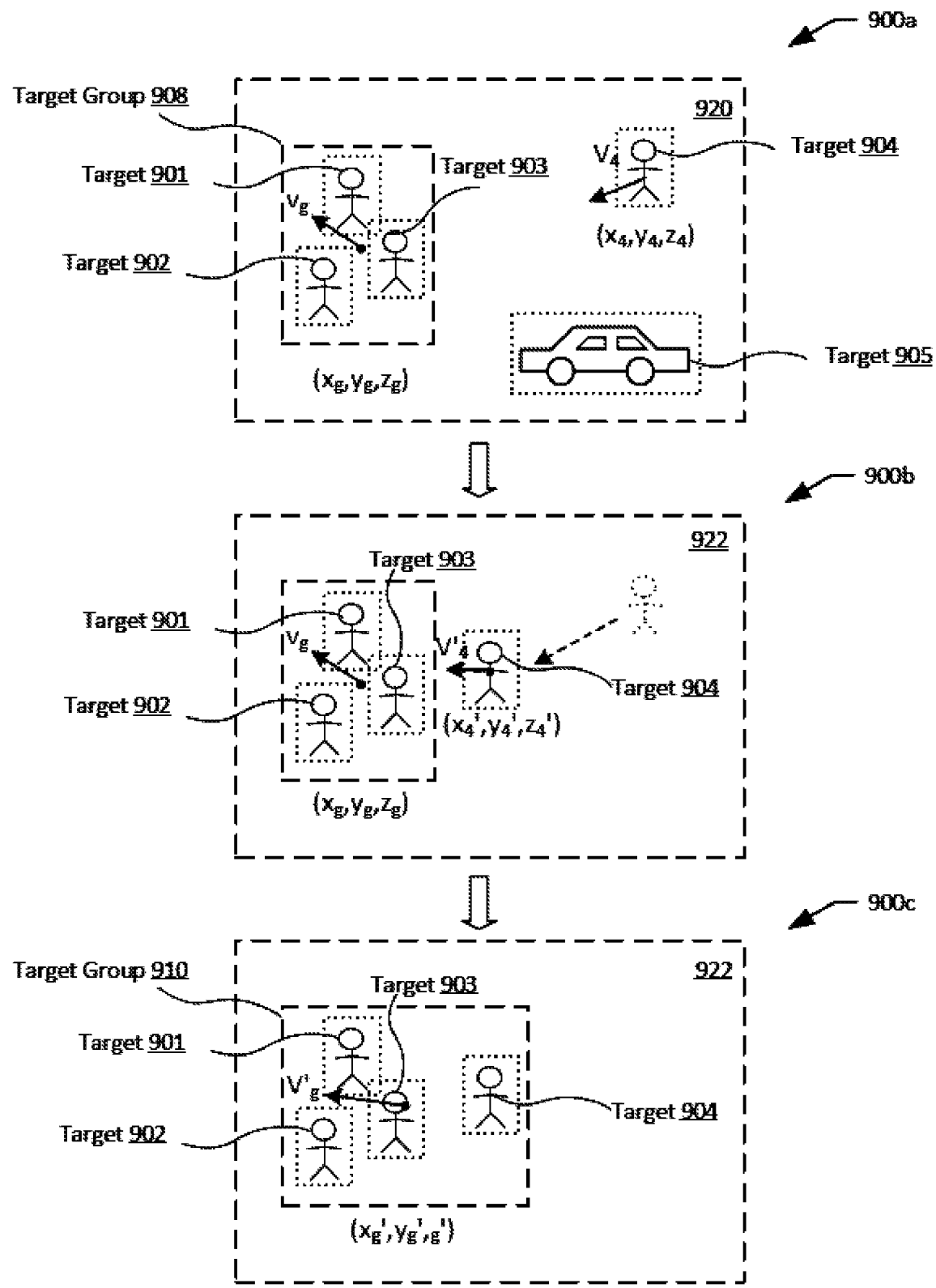
FIG. 9 illustrates adding a target object to a target group, in accordance with embodiments.

FIG. 9 illustrates adding a target object to a target group, in accordance with embodiments. As illustrated in 900a, target objects 901, 902, 903, 904 and 905 have been identified in the image 920. Among these objects, target objects 901, 902, and 903 are selected as part of a target group 908, for example, based on the factors described herein. Target objects 904 and 905 are not part of the target group 908. The state of the target group can be determined based on the states of the target group members. For instance, the state of the target group 908 can include its position ($x_g$, $y_g$, $z_g$) and its velocity $v_g$. Note that while the state of the target group is shown as a 3D state for illustrative purposes only. In other embodiments, the state of the target group can include 2D state such as its size and/or position in an image coordinate system.

In the next image 922 as shown in 900b, the states of the target objects may change. For instance, the position of target object 904 may change from ($x_4$, $y_4$, $z_4$) to ($x_4'$, $y_4'$, $z_4'$) between images 920 and 922. Target object 905 may have moved out view in image 922. The velocity of target object 904 may change from $v_4$ to $v_4'$ between images 920 and 922. The changed state of the target object 904 may be compared with state of the target group 908. For instance, the updated position and/or the updated velocity of the target object 904 may be compared with the updated position and/or the updated velocity of the target group 908. As a result of the comparison, the target object 904 may now be included in the target group to generate the updated target group 910. For instance, a distance between the updated target object 904 and the position of the target group 908 may be less than or equal to a threshold distance. The difference between the velocity of the updated target object 904 and the velocity of the target group 908 (e.g., difference in direction and/or in speed) may be less than or equal to a threshold value.

As illustrated in 900c, an updated state of the target group 910 can be calculated based the inclusion of the target object 904. For instance, the updated position and velocity of the updated target group 910 are position $(x_g', y_g', z_g')$ and its velocity $v_g'$.

Based on the updated target group 910, an updated state of the target group 910 can be calculated based at least in part on the state of the newly added target object 904. For instance, the updated position and velocity of the updated target group 910 are position $(x_g', y_g', z_g')$ and velocity $v_g'$.

FIG. 10 illustrates removing a target object from a target group, in accordance with embodiments. As illustrated in 1000a, target objects 1001, 1002, 1003, 1004 and 1005 have been identified in the image 1020. Among these objects, target objects 1001, 1002, and 1003 are selected as part of a target group 1008, for example, based on the various factors described herein. Target objects 1004 and 1005 are not part of the target group 1008. The state of the target group can be determined based on the states of the target group members. For instance, the state of the target group 1008 can include its position $(x_g, y_g, z_g)$ and its velocity $v_g$.

In the next image 1022 as shown in 1000b, the states of the target objects may change. For instance, the position of target object 903 may change from $(x_3, y_3, z_3)$ to $(x_3', y_3', z_3')$ between images 1020 and 1022. The velocity of target object 1003 may change from $v_3$ to $v_3'$ between images 1020 and 1022. The changed state of the target object 1003 may be compared with state of the target group 1008. For instance, the updated position and/or the updated velocity of the target object 1003 may be compared with the updated position and/or the updated velocity of the target group 1008. As a result of the comparison, the target object 1003 may now be excluded from the target group to derive the updated target group 1010. For instance, a distance between the updated target object 1003 and the position of the target group 1008 may be greater than a threshold distance. The difference between the velocity of the updated target object 1003 and the velocity of the target group 1008 (e.g., difference in direction and/or in speed) may be greater than a threshold value. As illustrated in 1000c, an updated state of the target group 1010 can be calculated based the exclusion of the target object 1003. For instance, the updated position and velocity of the updated target group 1010 are position $(x_g', y_g', z_g')$ and velocity $v_g'$.

While FIGS. 9 and 10 illustrate the addition and removal of a single target object to and from a target group, it is understood that in various embodiments, more than one target objects may be added and/or removed when the target group is updated for each new image frame. Such addition and/or removal of group members can be performed based on any or any combination of the factors for target group selection discussed herein.

In some embodiments, the target group may be updated based at least in part on the state of one or more primary targets. FIG. 11 illustrates updating a target group based on a primary target, in accordance with embodiments. As illustrated in 1100a, target objects 1101, 1102, 1103, and 1104 have been identified in the image 1120. Among these, target objects 1101, 1102, and 1103 are selected as part of a target group 1108, for example, based on their close proximity to the primary target 1101. Target object 1104 is not part of the target group 1108. The state of the target group can be determined based on the states of the target group members. For instance, the state of the target group 1108 can include its position $(x_g, y_g, z_g)$ and its velocity $v_g$.

In a subsequent image 1122, as illustrated in 1100b, the state (e.g., position and/or velocity) of the primary target 1101 may change. Accordingly, an updated target group 1110 may be generated based on the updated state of the primary target 1101. For instance, targets that are within a given threshold distance to the updated position of the primary targets may be added to the target group; whereas targets that are outside the threshold distance may be removed from the target group. Additionally or alternatively, the velocities of the targets may be compared with the velocity of the updated primary target. If the difference in direction is within a predetermined threshold angle, and/or if the difference in speed is within a predetermined threshold value, then the targets may be added to the updated target group. For instance, based on the above-discussed criteria, target 1104 is added to the target group 1110 and target 1102 is no longer in the target group 1110. The updated target group 1110 now includes the primary target 1101 along with targets 1103 and 1104.

In some embodiments, the target group may be updated based on user input, changing target state, changing environment, and the like. For instance, a user may change the type of targets to track, change a primary target, or otherwise select different target objects to track, for example, via a user interface (e.g., touchscreen) of a remote terminal. As another example, weight values associated with the target objects may change as time goes on, for example, based the target objects' relationship to a reference object, the target objects' appearance in images, and the like. And the target group may be updated based on the changed weight values.

Referring back to FIG. 5, at block 506, the updated target group can be tracked. In some embodiments, a state of the update target group can be determined, for example, based on the states of the group members. The tracking may be based on the state of the updated target group. For example, the position and/or size of the target group in the imaging coordinate system may be compared with the position and/or size of previous target group. As another example, the position and/or size of the target group in the navigation coordinate system may be compared with the position and/or size of previous target group. The difference in the states can be used to generate control signals for controlling the tracking system, so as to minimize the difference. Any suitable tracking method can be used including those described in connection with block 410 of FIG. 4.

Figure 6:
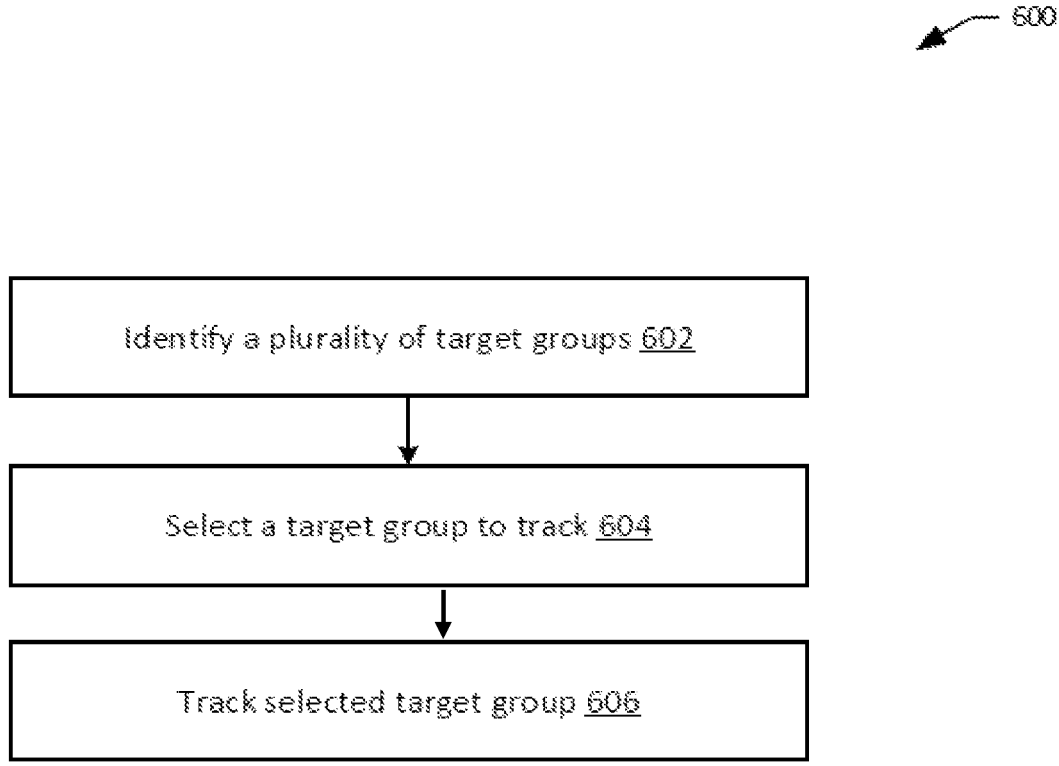
FIG. 6 illustrates another exemplary process for implementing multi-target tracking, in accordance with embodiments.

FIG. 6 illustrates another exemplary process 600 for implementing multi-target tracking, in accordance with embodiments.

At block 602, a plurality of target groups are identified based on one or more images. Each target group may be determined based on any of the factors described herein. For example, target objects in an image can be identified. Targets objects that are within a certain proximity to each other or to a certain reference point may be grouped into one target group. Alternatively or additionally, the target group determination may be based on object velocities and/or object types. For example, objects moving toward similar directions and/or at similar speeds may be grouped together. Objects having the same type or similar types may be grouped together. Multiple target groups can be identified based on a given image frame. In various embodiments, the grouping of the target objects may be performed based on user input, by an automated process (e.g., based on machine learning algorithms), or by a combination thereof.

At block 604, a target group to be tracked can be selected among the plurality of target groups determined above. Treating each of the target group as a target object, methods for determining a primary target from a plurality of targets can be extended to the selection of a target group from a plurality of target. In some embodiments, the state of a target group can be calculated based at least in part on the states of the group members. For instance, the position and/or velocity of the target group can be calculated as an average or weighted average of the states of the group members. The target group selection can be based on the states of the target groups. For example, the target group that is closest to a reference point (e.g., image center) may be selected. Alternatively or additionally, the selection of the target group from a plurality of target groups may be based on moving directions and/or the speeds of the target groups. For example, the group that is moving the fastest, or slowest among the groups may be selected. Or, the group that is moving greater than or less that a certain threshold speed may be selected. Or, the group with a moving direction closest to a reference direction may be selected.

In some embodiments, the target group selection can be based on other information. For instance, the selection can be based on the size of each group. The size of a target group can be a number of target objects in the target group, or the size of the target group in an image (e.g., in pixels), which may be approximated by the dimensions of a bounding box for the target group. For instance, a target group with the largest, the smallest, or the medium number of group members may be selected. In another example, the target group that appear the largest in size may be selected.

In some embodiments, the target group selection can be based on weighted values. Each target group may be assigned a weight value. In some cases, the weight value of a target group may be calculated based on the weight values associated with the group members. When higher weight values indicate higher importance, the target group with the highest weight value may be selected. The weight values may be assigned to targets or target groups based on considerations discussed elsewhere herein. In various embodiments, the selection of the target group may be performed based on user input, by an automated process (e.g., based on machine learning algorithms), or by a combination thereof.

At block 606, the selected target group may be tracked, for example, using any of the tracking methods described in herein.

Figure 12:
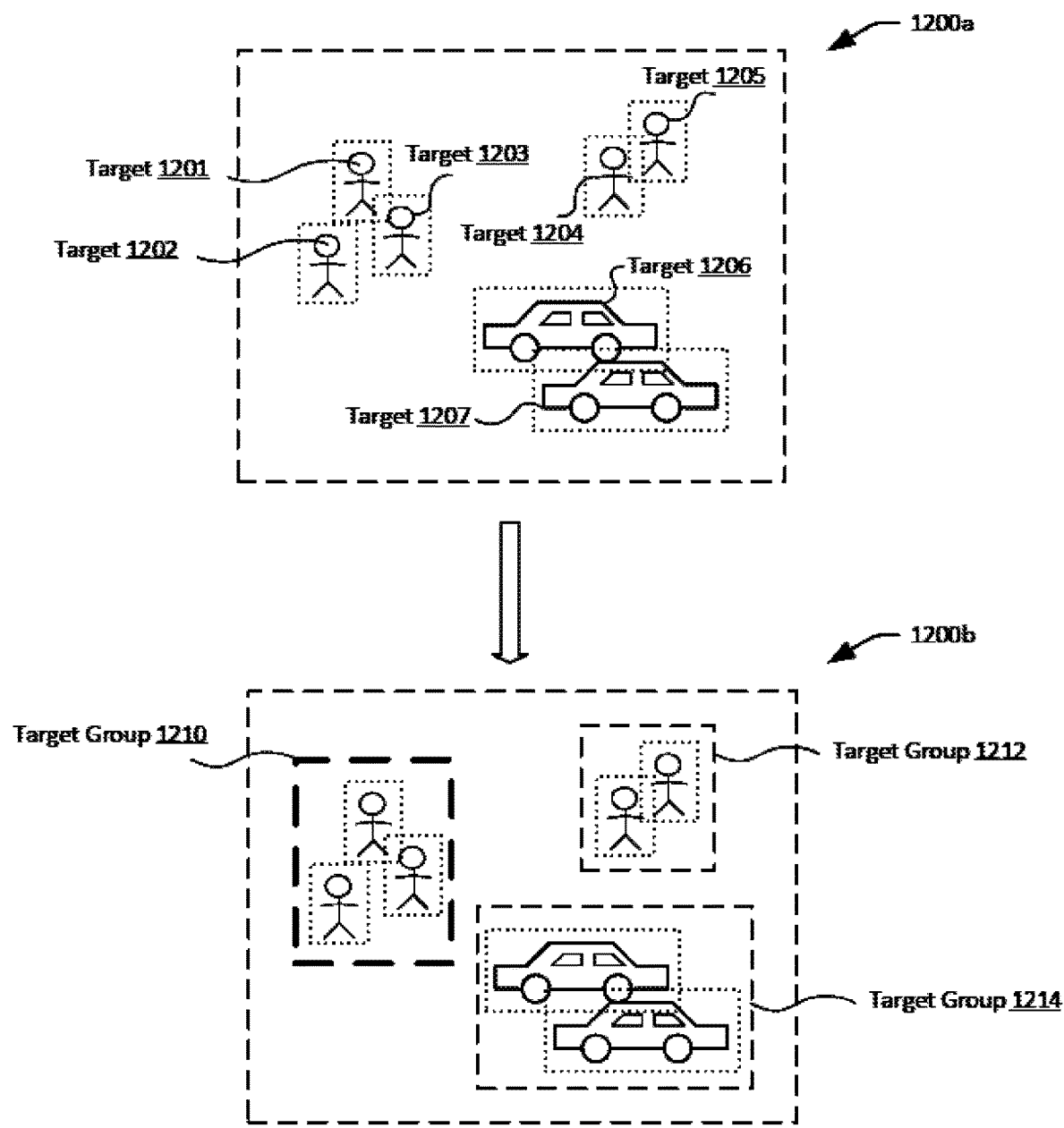
FIG. 12 illustrates an example of target group selection, in accordance with embodiments.

FIG. 12 illustrates an example of target group selection, in accordance with embodiments. As illustrated in 1200a, the target objects 1201, 1202, 1203, 1204, 1205, 1206, and 1207 have been identified in an image. As illustrated in 1200b, the identified target objects can be grouped into target groups 1210 (comprising target objects 1201, 1202, and 1203), 1212 (comprising target objects 1203 1204), and 1214 (comprising target objects 1205 and 1206). The grouping of the target objects can be based on the target objects' proximity to each other, based on their object types, based on user selection, or any other consider discussed herein. Among these target groups, target group 1210 may be selected for tracking purpose. The target group 1210 may be selected based on its state, weight value, or any other consideration discussed herein.

FIGS. 13-20 illustrate tracking of a target group, in accordance with embodiments. A tracking device can include a movable object (e.g., a UAV) and/or an imaging device.

Figure 13:
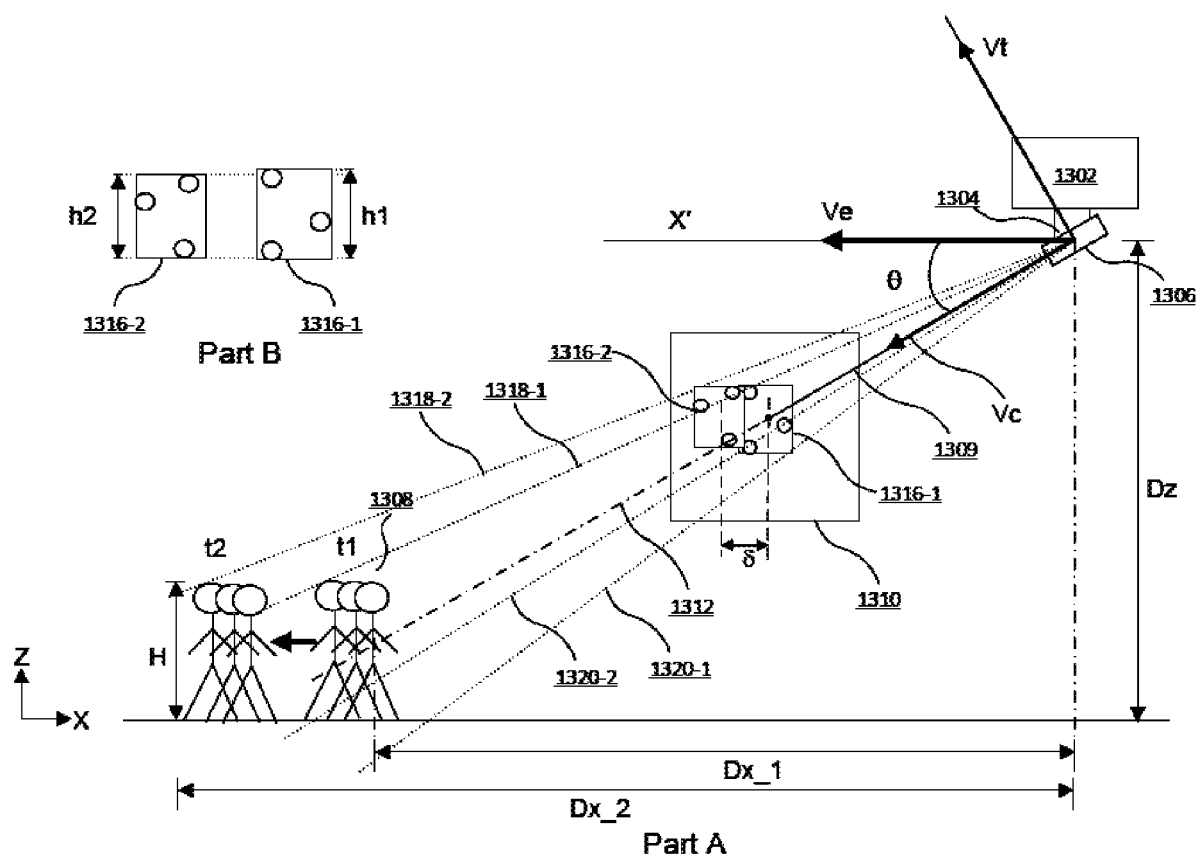
FIG. 13 illustrates tracking of a target group when the target group moves in a translational motion relative to the tracking device, in accordance with some embodiments.

FIG. 13 illustrates tracking of a target group when the target group moves relative to the tracking device, in accordance with some embodiments. As shown in part A of FIG. 13, the target group may be located at a horizontal distance Dx_1 and a vertical distance Dz from the tracking device at time t1. The target group may have a height H. The height of the target group may be determined based on a scale within the image frames. Optionally, the height of the target group may be estimated depending on the type of objects or object class (e.g., persons, vehicles, etc.).

The imaging device may be configured to capture a first image 1314-1 of the target group 1308 onto a first image plane 1310-1 at time t1. Points on the first image plane 1310-1 may be represented by a set of (u, v) image coordinates. A first bounding box 1316-1 may be configured to substantially surround the first image 1314-1 of the target group. The bounding box may be configured to vary in size and/or position when the target group moves relative to the tracking device.

The size and position of the first bounding box may be defined by optical rays 1318-1 and 1320-1. The optical ray 1318-1 may pass through the mirror center of the imaging device, a first image point on the first image plane 1310-1, and the first target point on the target group 1308. The optical ray 1320-1 may pass through the mirror center of the imaging device, a second image point on the first image plane 1310-1, and the second target point on the target group 1308. The first bounding box may be located substantially at a center portion of the first image plane 1310-1. For example, a set of center coordinates (x1, y1) of the first bounding box may coincide with a center C of the first image plane. In some alternative embodiments, the first bounding box may be located substantially away from the center portion of the first image plane 1310-1, and the center coordinates (x1, y1) of the first bounding box may not coincide with the center C of the first image plane. As shown in part A of FIG. 13, a size of the first bounding box may characterized by a first height h1.

Figure 14:
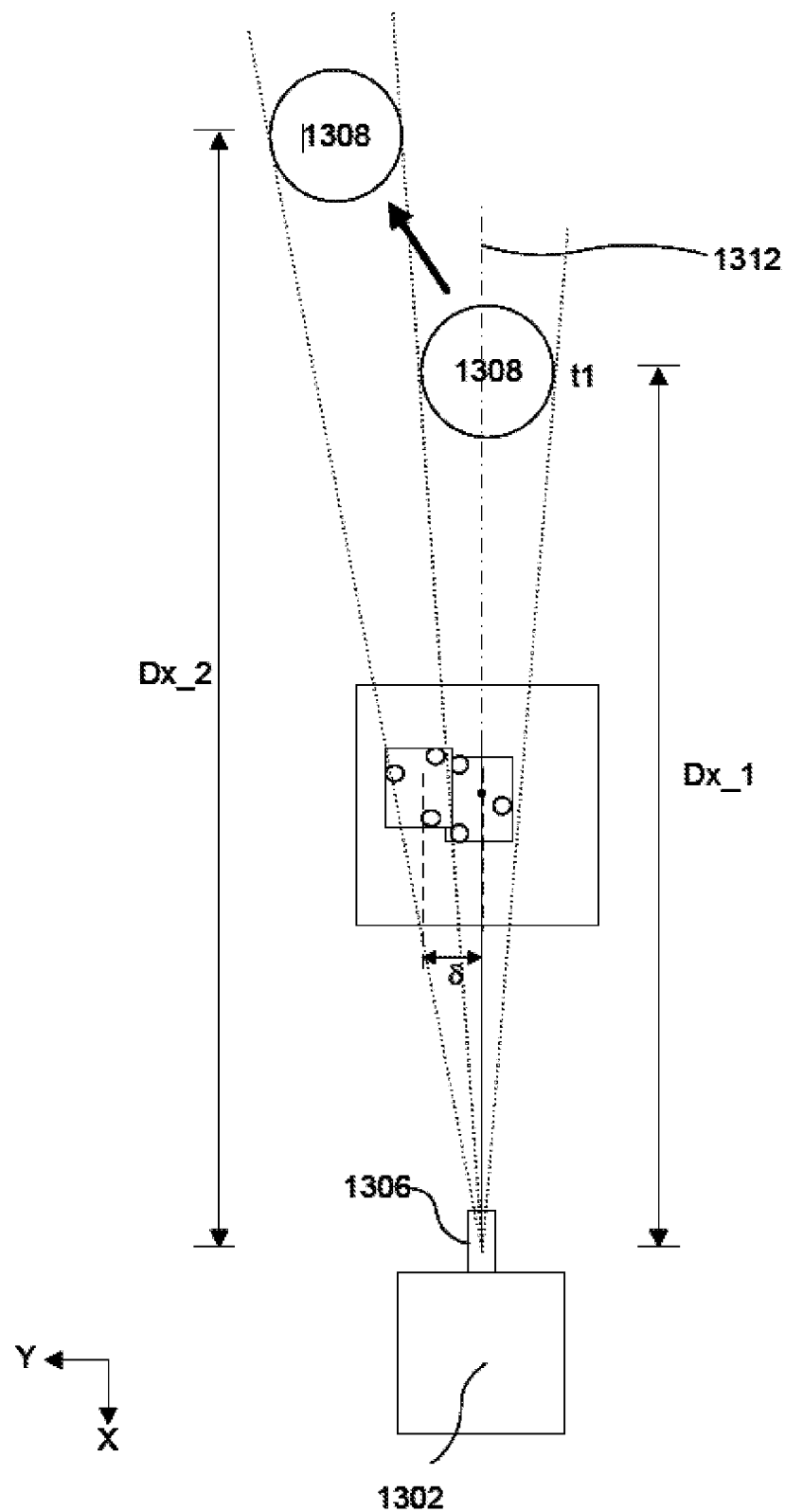
FIG. 14 illustrates a different visual depiction of the embodiment of FIG. 13, in accordance with some embodiments.

At time t2, the target group may have moved to a different position relative to the tracking device. For example, the target group may have moved away from the tracking device along both the X and Y axes (e.g., as shown in FIG. 14), such that the target group is located at a distance Dx_2 from the tracking device. FIG. 14 illustrates the tracking device and the target group as viewed from above, and shows the translational movement of the target group along the X-Y plane (e.g., a reference surface or a ground plane) as it moves away from the tracking device. The vertical distance Dz between the target group and the tracking device may remain unchanged. As shown in part A of FIG. 13, the optical axis 1312 may no longer extend from the mirror center of the imaging device to the center portion of the target group at time t2. When the target group moves further away from the tracking device, the size of the bounding box may decrease. For example, as shown in part B of FIG. 13, a size of the second bounding box in the second image frame may be characterized by a second height h2, where h2<h1.

The imaging device may be configured to capture a second image 1314-2 of the target group onto a second image plane 1310-2 at time t2. Points on the second image plane 1310-2 may also be represented by a set of (u, v) image coordinates. A second bounding box 1316-2 may be configured to substantially surround the second image 1314-2 of the target group. The size and position of the second bounding box may be defined by optical rays 1318-2 and 1320-2. The optical ray 1318-2 may pass through the mirror center of the imaging device, a first image point on the second image plane 1310-2, and the first target point on the target group 1308. The optical ray 1320-2 may pass through the mirror center of the imaging device, a second image point on the second image plane 1310-2, and the second target point on the target group 1308. Unlike the first bounding box, the second bounding box may not be located at a center portion of the second image plane 1310-2. For example, a set of center coordinates (x2, y2) of the second bounding box may not coincide with a center C of the second image plane. For example, as shown in FIGS. 13 and 14, the second bounding box may be shifted from the center C of the second image plane by an offset distance δ.

Figure 15:
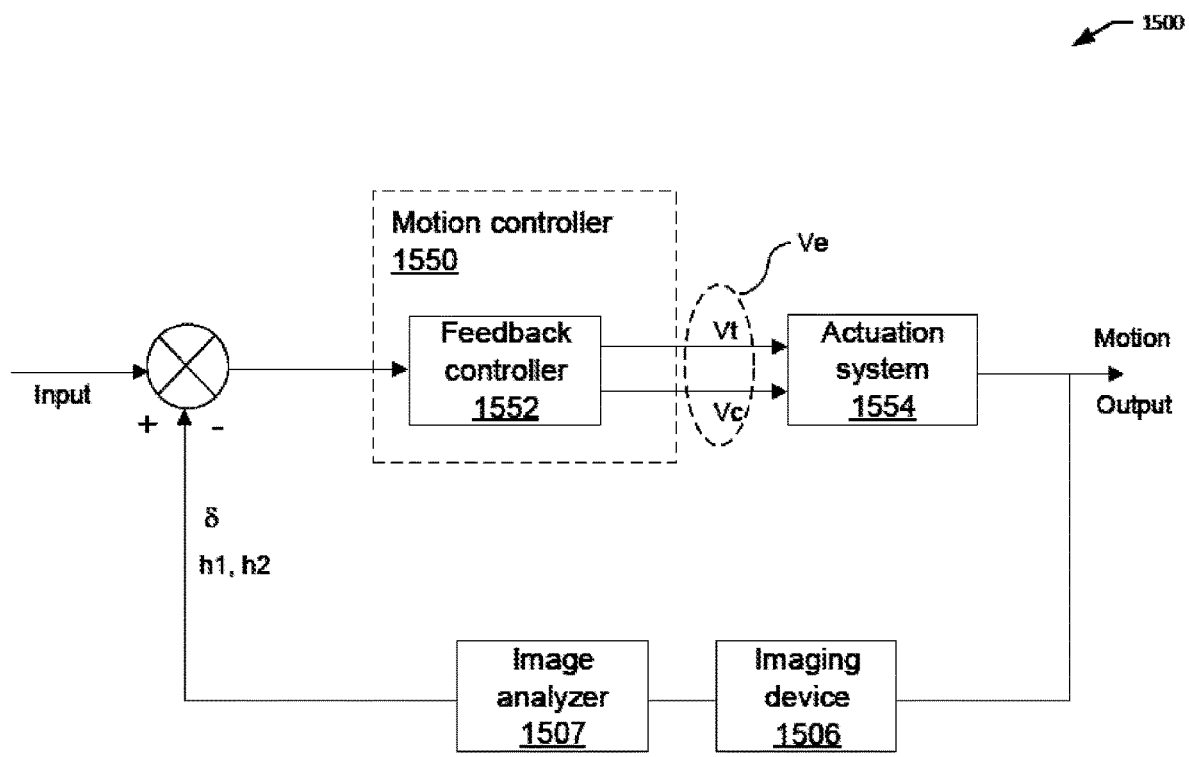
FIG. 15 illustrates a block diagram of an exemplary feedback control loop for tracking a target group based on relative translational movement between the tracking device and the target group, in accordance with some embodiments.

FIG. 15 illustrates a block diagram of an exemplary feedback control system for adjusting movement of the tracking device based the change in size and position of the bounding box in FIGS. 13 and 14, in accordance with some embodiments. As shown in FIG. 15, a feedback control system 1500 may comprise an imaging device 1506, an image analyzer 1507, a motion controller 1550, and an actuation system 1554. The motion controller may comprise a feedback controller 1552. The feedback control system may be configured to obtain a first velocity component by minimizing the change in position of the bounding box between image frames, and a second velocity component by minimizing the change in size of the bounding box between image frames. The feedback control system may be further configured to track the target group by adjusting movement of the tracking device based on the first and second velocity components.

The first velocity component may be obtained by minimizing a positional error using the feedback control loop. The positional error may be calculated based on a change in position of a bounding box between the first image frame and the second image frame in FIGS. 13 and 14. The change in position of the bounding box may be determined relative to a reference point within the first image frame and the second image frame. The first velocity component may be obtained by minimizing the difference between the position of the bounding box at times t1 and t2 using the feedback control loop. As previously described, the change in position of the bounding box may be associated with the offset distance δ.

The second velocity component can be obtained by minimizing the change in size of the bounding box between image frames. The second velocity component may be obtained by minimizing a distance error using the feedback control loop. The distance error may be calculated based on a first distance between the tracking device and the target group at a first time instance (t1) and a second distance between the tracking device and the target group at a second time instance (t2). The first distance and the second distance may be calculated based on the size (e.g., height) of the bounding box in the first image frame and the second image frame.

The input to system 1500 may comprise a threshold positional offset and a threshold distance. In some cases, the threshold positional offset and the threshold distance may be zero or substantially zero, in order to minimize the offset distance δ and the distance error. When the threshold positional offset and the distance error are zero, the system may adjust the movement of the tracking device such that the bounding box maintains substantially a same position and size across the image frames.

The imaging device may be configured to capture image data (e.g., the first and second image frames in FIG. 13). The image data may be provided to the image analyzer. The image analyzer may be configured to analyze the image data to determine the change in position of the bounding box (offset distance δ) between image frames. The change in position of the bounding box may be compared against the input, and provided to the feedback controller. In FIG. 13, since the movement of the target group is not orthogonal to the optical axis (see FIG. 14), the positional error d_error1 may have to be corrected to account for the orientation (tilt) in the imaging device. The feedback controller may be configured to correct for the positional error d_error1 by calculating a positional error d_error3 in the bounding box at time t2, using the following equation:

$$d\_error3 = \frac{Dz * \tan(\delta * p)}{\sin(\tau) * \sin(\tau - p * \delta)}$$

where δ is the offset distance, p is an angle represented by each pixel in the second image frame, Dz corresponds to a vertical distance along the Z-axis between the tracking device and the target group, and τ is an orientation of the imaging device. The orientation of the imaging device may comprise a roll, yaw, and/or pitch angle of the imaging device defined relative to the tracking device and/or movable object. In the example of FIG. 13, the orientation τ of the imaging device may correspond to the pitch angle θ of the imaging device.

The image analyzer may also be configured to analyze the image data to determine the heights of the bounding box in the first and second image frames. The heights of the bounding box may be provided to the feedback controller 1552. A distance between the tracking device and the target group may be obtained based on the size (height) of the bounding box in each image frame. For example, the feedback controller may be configured to calculate a first distance Dx_1 between the tracking device and the target group at time t1, and a distance Dx_2 between the tracking device and the target group at time t2, using the following equations:

$$Dx\_1 = \frac{H}{2 * \tan(h1 * p)}$$

$$Dx\_2 = \frac{H}{2 * \tan(h2 * p)}$$

where p is an angle represented by each pixel in the first and second image frames, H is the height of the target group, h1 is the height of the first bounding box, and h2 is the height of the second bounding box.

The feedback controller may be further configured to calculate the distance error d_error2 between the positions of the target group at times t1 and t2, using the following equation:

$$d\_error2 = Dx\_1 - Dx\_2$$

Next, the feedback controller may use a proportional-integral-derivative (PID) method (or a proportional-derivative (PD) method) to minimize d_error3 and d_error2, thereby obtaining the first velocity component Vt and the second velocity component Vc. The first and second velocity components may be provided to the actuation system 1554. The actuation system may be configured to adjust the movement of the tracking device along a predefined axis X' based on the first and second velocity components, so as to track the target group. The predefined axis X' may correspond to a natural direction along which the tracking device moves (see, e.g., FIGS. 13 and 16). In some embodiments, the predefined axis X' may be parallel to a reference surface (e.g., a horizontal ground plane). The optical axis may be oblique to the predefined axis such that the optical axis may be at an angle θ relative to the predefined axis. The optical axis may lie on a plane that is oblique to the horizontal ground plane. In FIG. 13, the first velocity component Vt may be orthogonal to the optical axis 1312, and the second velocity component Vc may be parallel to or along the optical axis. Accordingly, the first velocity component Vt and the second velocity component Vc may be orthogonal to each other.

By adjusting the movement of the tracking device based on the first and second velocity components, the bounding box can maintain substantially the same position and size across image frames. The adjusted movement of the tracking device may correspond to a motion output of the feedback control system. The above steps may be repeated iteratively in a closed loop until the positional error d_error3 is equal to or less than the threshold positional offset, and the distance error d_error2 is equal to or less than the threshold distance. The first velocity component and/or the second velocity component may dynamically change during the one or more iterations in the above steps.

Figure 16:
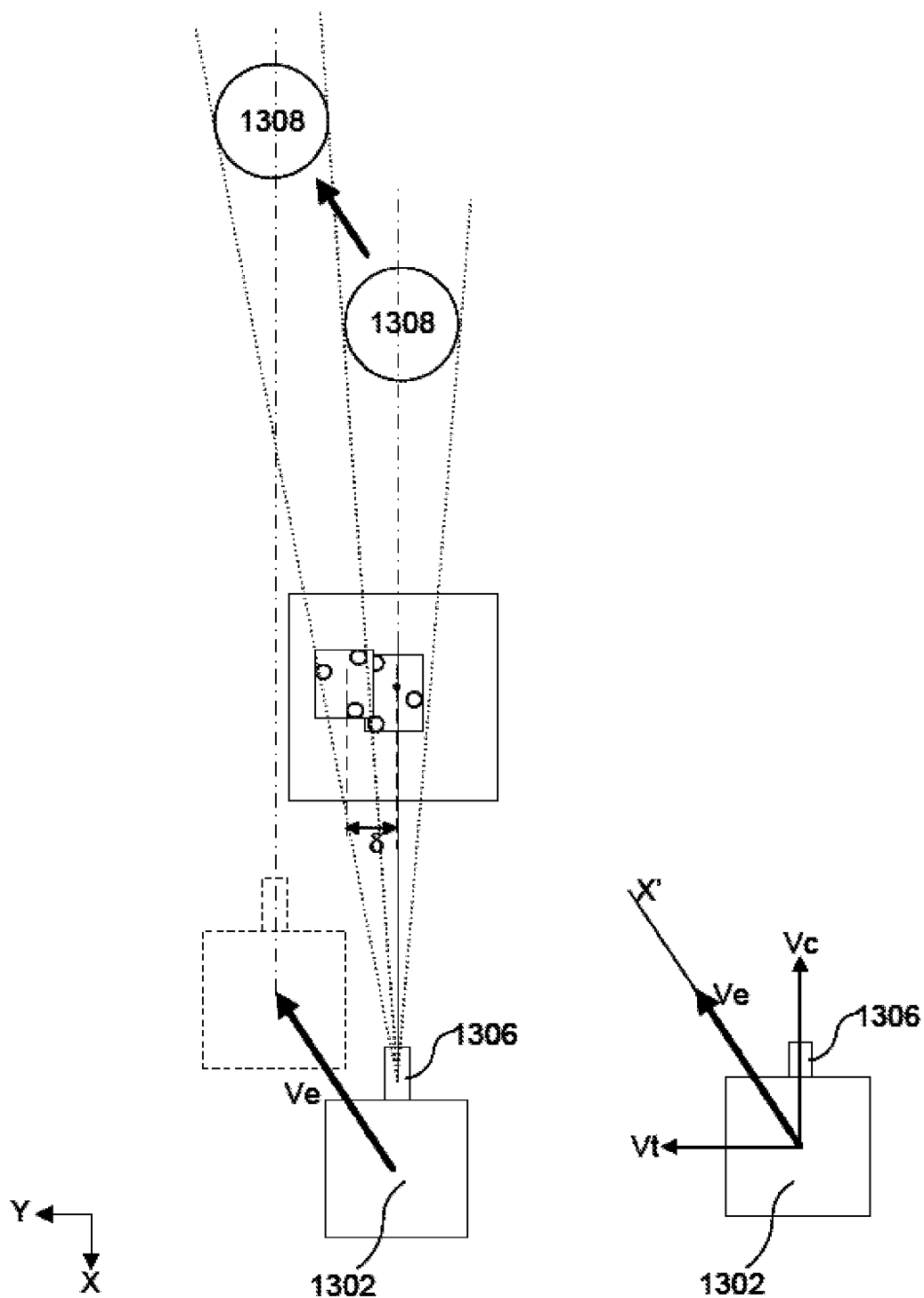
FIG. 16 illustrates tracking of a target group using a feedback control system, in accordance with some embodiments.

In the examples of FIGS. 13 through 19, the actuation system may be configured to adjust the movement of the tracking device along the predefined axis X' using the expected velocity vector Ve to track the target group as the target group moves in a translational motion relative to the tracking device. The expected velocity vector Ve may extend along the direction of the predefined axis X', for example as shown in FIG. 16. The actuation system may be configured to obtain (calculate) the expected velocity vector Ve based on the first velocity component Vt, the second velocity component Vc, and the orientation τ of the imaging device. The expected velocity vector may be a fusion (or combination) of the first and second velocity components. A fusion factor λ may be a function of the orientation of the imaging device. In some cases, the fusion factor λ may be given by $\sin^2 \tau$. In other cases, the fusion factor λ may be given by $\cos^2 \tau$. In some embodiments, the expected velocity vector may be obtained by (1) multiplying Vt with λ, (2) multiplying Vc with (1−λ), and (3) taking a square root of the sum of the products in (1) and (2). In some embodiments, the expected velocity vector may be obtained by applying different weights to the first velocity component Vt and the second velocity component Vc. The different weights may be based on the orientation τ and/or the fusion factor λ. For example, a higher weight may be applied to the first velocity component Vt than the second velocity component Vc when the tracking device is substantially located above the target group. Conversely, a higher weight may be applied to the second velocity component Vc than the first velocity component Vt when the tracking device is located substantially in line with the target group on a horizontal axis (e.g., as shown in FIG. 13).

Figure 17:
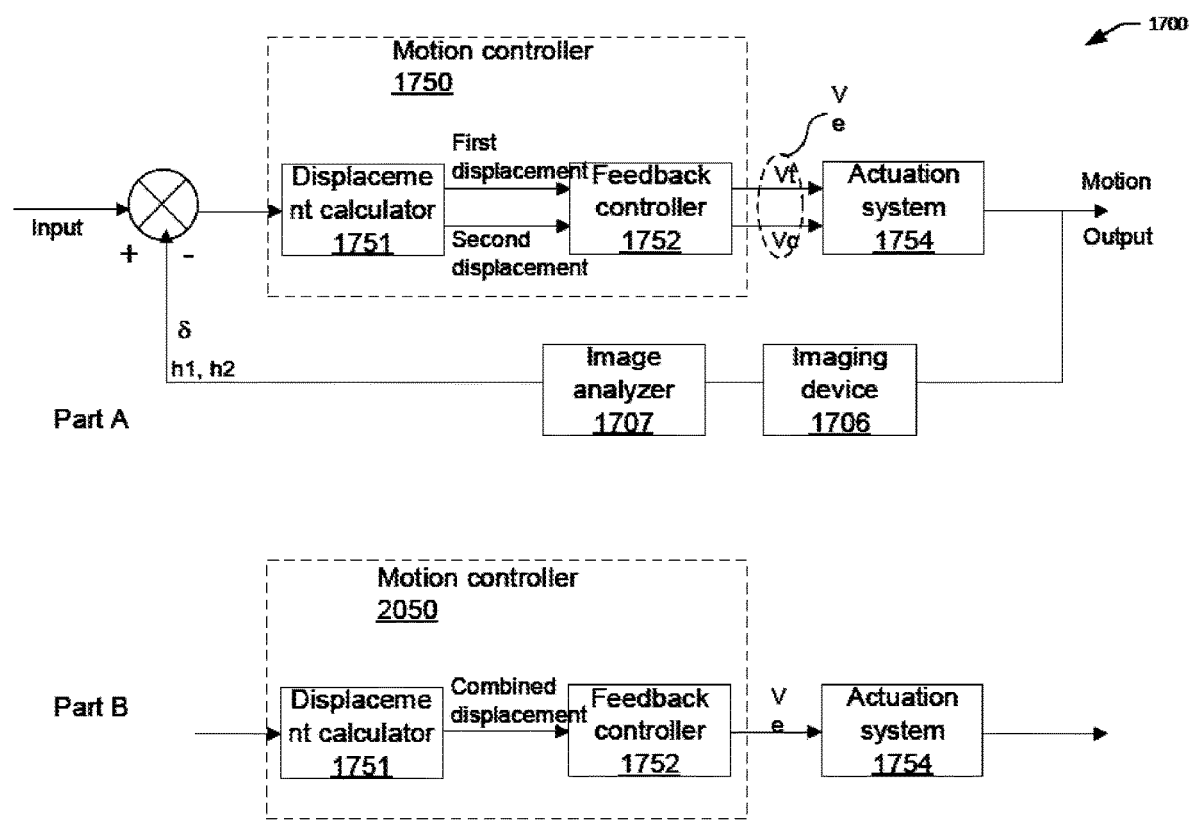
FIG. 17 illustrates a block diagram of an exemplary feedback control loop for tracking a target group based on minimization of the change in relative displacements between the tracking device and the target group, in accordance with some embodiments.

The orientation of the imaging device may comprise a roll, yaw, and/or pitch angle of the imaging device. In the example of FIGS. 13 through 16, the orientation τ of the imaging device may correspond to the pitch angle θ of the imaging device. FIG. 17 illustrates a block diagram of an exemplary feedback control system for adjusting movement of the tracking device based the change in size and position of the bounding box in FIGS. 13 and 14, in accordance with some further embodiments. The system of FIG. 17 may be similar to the system of FIG. 15 except for the following differences. As shown in Part A of FIG. 17, the motion controller 1750 may further comprise a displacement calculator 1751. The displacement calculator may be configured to calculate a first relative displacement between the tracking device and the target group based on the change in position of the bounding box between the first image frame and the second image frame in FIGS. 13 and 14. The displacement calculator may be configured to calculate a second relative displacement between the tracking device and the target group based on the change in size of the bounding box between the first image frame and the second image frame in FIGS. 13 and 14.

The feedback controller may be configured to receive signals indicative of the first relative displacement and the second relative displacement from the displacement calculator. Next, the feedback controller may use a proportional-integral-derivative (PID) method (or a proportional-derivative (PD) method) to minimize the first and second relative displacements, thereby obtaining the first velocity component Vt and the second velocity component Vc. The first and second velocity components may be provided to the actuation system 1754. The actuation system may be configured to adjust the movement of the tracking device along a predefined axis X' based on the first and second velocity components, so as to track the target group.

By adjusting the movement of the tracking device based on the first and second velocity components, the bounding box can maintain substantially the same position and size across image frames. The adjusted movement of the tracking device may correspond to a motion output of the feedback control system. The above steps may be repeated iteratively in a closed loop until the first relative displacement is equal to or less than a first threshold displacement, and the second relative displacement is equal to or less than a second threshold displacement. The first and second threshold displacements may be the same or different. In some cases, the first and second threshold displacements may be substantially equal to zero. The first velocity component and/or the second velocity component may dynamically change during the one or more iterations in the above steps.

Part B of FIG. 17 illustrates another embodiment of the motion controller, and is similar to the motion controller in Part A except for the following differences. In Part B, the displacement calculator may be configured to further calculate a combined displacement by fusing or combining together the first relative displacement and the second relative displacement. The feedback controller may be configured to receive signals indicative of the combined displacement from the displacement calculator. Next, the feedback controller may use a proportional-integral-derivative (PID) method (or a proportional-derivative (PD) method) to minimize the combined displacement, so as to obtain an expected velocity component Ve. As previously described, the expected velocity component Ve may be a fusion of the first velocity component Vt and the second velocity component Vc. However, in part B of the FIG. 17, the fusing together of the first and second velocity components need not be performed since the expected velocity component can be obtained directly from the combined displacement (e.g., as a derivative of the combined displacement as a function of time). The expected velocity component may be provided to the actuation system 1754. The actuation system may be configured to adjust the movement of the tracking device along a predefined axis X' based on the expected velocity component, so as to track the target group.

By adjusting the movement of the tracking device based on the expected velocity component, the bounding box can maintain substantially the same position and size across image frames. The adjusted movement of the tracking device may correspond to a motion output of the feedback control system. The above steps may be repeated iteratively in a closed loop until the combined displacement is equal to or less than a threshold combined displacement. In some cases, the threshold combined displacement may be substantially equal to zero. The expected velocity component may dynamically change during the one or more iterations in the above steps.

In some embodiments, an expected rotating angular speed for the movable object may be obtained based on a change in one or more characteristics associated with the one or more features, as described below with reference to FIGS. 18 and 19.

Figure 18:
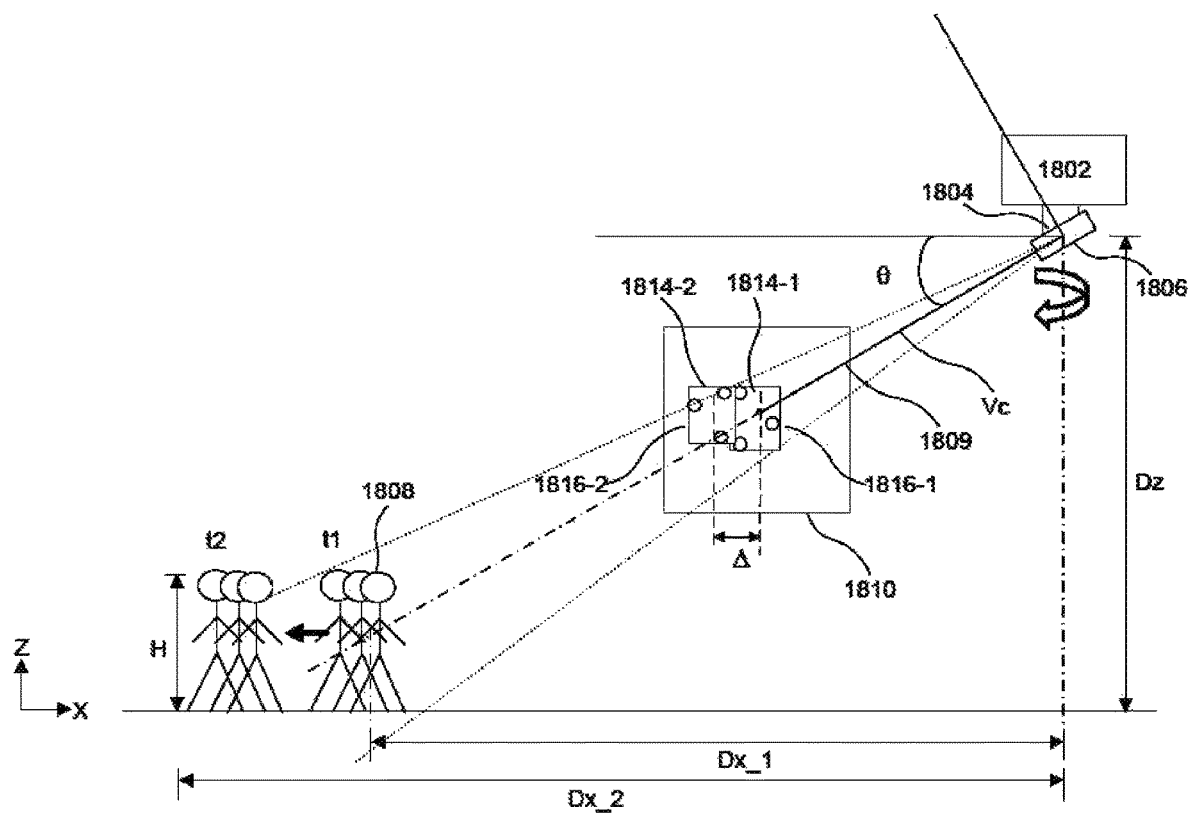
FIG. 18 illustrates tracking of the target group by changing the orientation of the tracking device relative to the target group, in accordance with some embodiments.

Referring to FIG. 18, an imaging device on a tracking device may be configured to capture a first image 1814-1 of a target group onto a first image plane 1810-1 at time t1. A first bounding box 1816-1 may be configured to substantially surround the first image 1814-1 of the target group. The bounding box may be configured to vary in size and/or position when the orientation of the tracking device changes relative to the target group. For example, the tracking device may rotate about a yaw, roll, and/or pitch axis defined relative to the movable object on which the tracking device is carried. The first bounding box may be located substantially at a center portion of the first image plane 1810-1 at time t1. For example, a set of center coordinates (x1, y1) of the first bounding box may coincide with a center C of the first image plane. In some alternative embodiments, the first bounding box may be located substantially away from the center portion of the first image plane 1810-1, and the center coordinates (x1, y1) of the first bounding box may not coincide with the center C of the first image plane.

At time t2, the target group may have moved to a different position in both X and Y directions. To continue tracking the target group, the imaging device (or the tracking device) may rotate in a yaw direction (e.g., about the Z-axis) relative to the target group, as shown in FIG. 19. The imaging device may be configured to capture a second image 1814-2 of the target group onto a second image plane 1810-2 at time t2. A second bounding box 1816-2 may be configured to substantially surround the second image 1814-2 of the target group. Similar to the first bounding box, the second bounding box may be located at a center portion of the second image plane 1810-2 due to rotation of the imaging device about the yaw axis. For example, a set of center coordinates (x2, y2) of the second bounding box may coincide with a center C of the second image plane. The coordinate y2 may be shifted from a center C of the first image plane by an offset distance $\Delta$.

Figure 20:
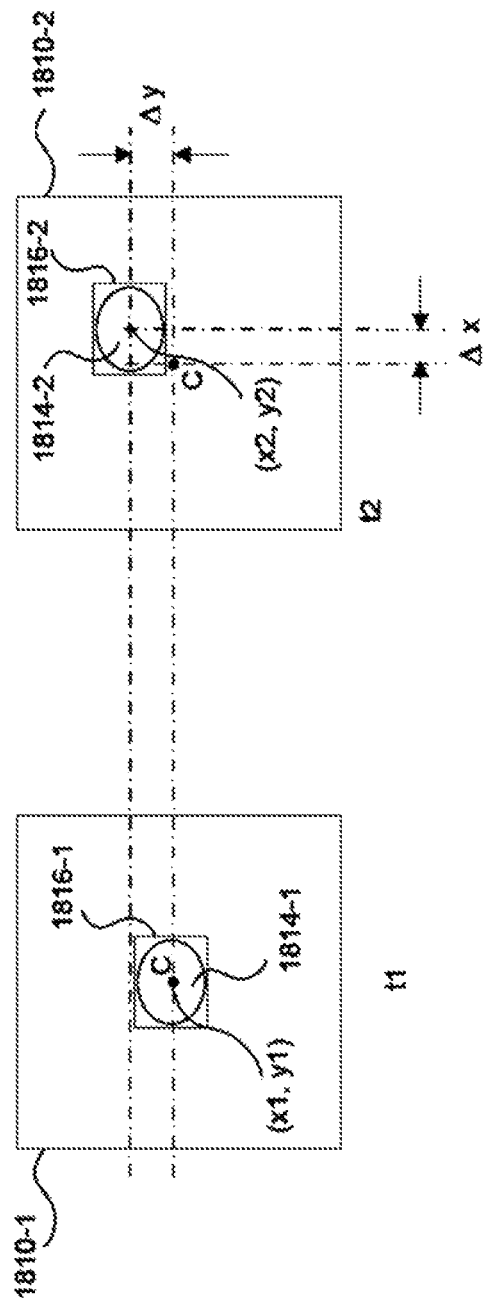
FIG. 20 illustrates the change in position of a bounding box in a plurality of image frames when a tracking device changes its orientation in a yaw direction and a pitch direction relative to a target group, in accordance with some embodiments.

In some embodiments, the change in orientation of the tracking device may include a rotation of the tracking device in both a yaw direction (Z-axis) and a pitch direction (Y-axis). For example, as shown in FIG. 20, the coordinate y2 may be shifted from the center C of the second image plane by an offset distance $\Delta y$, and the coordinate x2 may be shifted from the center C of the second image plane by an offset distance $\Delta x$. The offset distance $\Delta y$ may be caused by the rotation of the tracking device about the pitch axis, and the offset distance $\Delta x$ may be caused by the rotation of the tracking device about the yaw axis.

The feedback control systems described herein can be configured to obtain the expected rotating angular speed based on a change in one or more characteristics associated with one or more features. For example, the expected rotating angular speed may be obtained based on the offset distance $\Delta$ along the u and/or v axes of the image frames or image planes. The feedback control system may be configured to obtain the expected rotating angular speed by minimizing the change in position (positional offset) of the bounding box between image frames. The feedback control system may be further configured to adjust movement of the tracking device based on the expected rotating angular speed to track the target group. For example, the feedback control system may effect a change in orientation of the tracking device (e.g., about a yaw, roll, and/or pitch axis) according to the expected rotating angular speed to track the target group.

The expected rotating angular speed may be obtained by minimizing a positional error using the feedback control loop. The positional error may be calculated based on a change in position of a bounding box between the first image frame and the second image frame in FIGS. 18, 19, and 20. The change in position of the bounding box may be determined relative to a reference point within the first image frame and the second image frame. The expected rotating angular speed may be obtained by minimizing the difference between the positions of the bounding box at times t1 and t2 using the feedback control loop. As previously described in FIGS. 18, 19, and 20, the change in position of the bounding box may be associated with the offset distance $\Delta$. The offset distance $\Delta$ may be along the u and/or v axes of the image frames or image planes. The input to the system may comprise a threshold positional offset. In some cases, the threshold positional offset may be zero or substantially zero, in order to minimize the offset distance $\Delta$. When the threshold positional offset is zero, the system may adjust the movement (e.g., rotation about a yaw, roll, and/or pitch axis) of the tracking device such that the bounding box maintains substantially a same position across the image frames.

Figure 19:
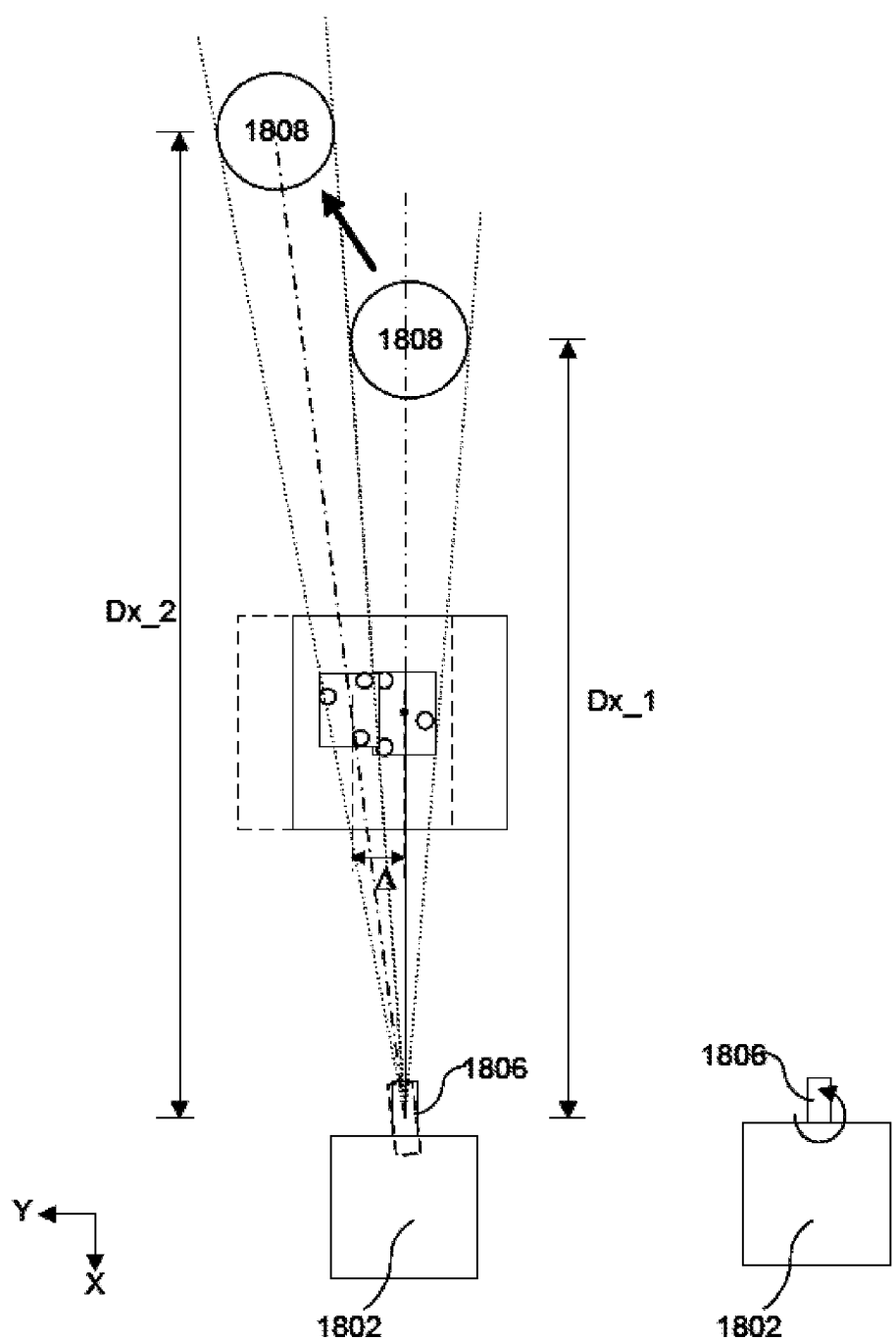
FIG. 19 illustrates a different visual depiction of the embodiment of FIG. 18, in accordance with some embodiments.

The imaging device may be configured to capture image data (e.g., the first and second image frames in FIGS. 18, 19, and 20). The image data may be provided to the image analyzer. The image analyzer may be configured to analyze the image data to determine the change in position of the bounding box (offset distance $\Delta$) between image frames. The change in position of the bounding box may be compared against the input, and provided to the feedback controller.

Next, the feedback controller may use a proportional-integral-derivative (PID) method (or a proportional-derivative (PD) method) to minimize the offset distance $\Delta$, thereby obtaining the expected rotating angular speed. The expected rotating angular speed may be provided to the actuation system. The actuation system may be configured to adjust the movement of the tracking device about an axis (e.g., a yaw, roll, and/or pitch axis) based on the expected rotating angular speed, so as to track the target group. By adjusting the movement of the tracking device based on the expected rotating angular speed, the bounding box can maintain substantially the same position across image frames. The adjusted movement of the tracking device may correspond to a motion output of the feedback control system. The above steps may be repeated iteratively in a closed loop until the offset distance $\Delta$ is equal to or less than the threshold positional offset. The expected rotating angular speed may dynamically change during the one or more iterations in the above steps.

In the above example, the offset distance $\Delta$ may be used to determine the expected rotating angular speed of the tracking device in order to track the target group. However, the disclosure is not limited thereto. As one of ordinary skill in the art would appreciate, the offset distance $\Delta$ can also be used to calculate a third velocity component Vt'. Unlike the first velocity component Vt which is in the X-direction, the third velocity component Vt' may be in a Y-direction. Accordingly, the movement of the tracking device may also be adjusted along the Y-direction to track the target group. For example, the feedback controller may be configured to calculate a positional error d_error4 in the bounding box at time t2 using the following equation:

$$d\_error4 = \tan(\Delta y * p) * Dz$$

where Δy is the offset distance along a v-axis in the second image frame, p is an angle represented by each pixel in the second image frame, and Dz corresponds to a vertical distance along the Z-axis between the tracking device and the target group.

Next, the feedback controller may use a proportional-integral-derivative (PID) method (or a proportional-derivative (PD) method) to minimize d_error4, thereby obtaining the third velocity component Vt'. The third velocity component Vt' may be provided to the actuation system. The actuation system may be configured to adjust the movement of the tracking device along a predefined axis (e.g., Y-axis) based on the third velocity component Vt', so as to track the target group. By adjusting the movement of the tracking device based on the third velocity component Vt', the bounding box can maintain substantially the same position across image frames. The adjusted movement of the tracking device may correspond to a motion output of the feedback control system. The above steps may be repeated iteratively in a closed loop until the positional error d_error4 is equal to or less than the threshold positional offset. The third velocity component Vt' may dynamically change during the one or more iterations in the above steps.

As previously described, the offset distance δ may be used to determine the first velocity component Vt. In some embodiments, the offset distance δ can also be used to calculate an expected gimbal pitch angle θ', so as to control the pitch angle of the tracking device. In those embodiments, the expected velocity vector along the predefined axis (e.g., X-axis) may be obtained by taking a difference between a current gimbal pitch angle and an initial gimbal pitch angle as an error amount, and minimizing the error amount to obtain the expected gimbal pitch angle θ', so as to implement tracking of the target group.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm³, 2 cm³, 5 cm³, 10 cm³, 20 cm³, 30 cm³, 40 cm³, 50 cm³, 60 cm³, 70 cm³, 80 cm³, 90 cm³, 100 cm³, 150 cm³, 200 cm³, 300 cm³, 500 cm³, 750 cm³, 1000 cm³, 5000 cm³, 10,000 cm³, 100,000 cm³3, 1 m³, or 10 m³. Conversely, the total volume of the movable object may be greater than or equal to about: 1 cm³, 2 cm³, 5 cm³, 10 cm³, 20 cm³, 30 cm³, 40 cm³, 50 cm³, 60 cm³, 70 cm³, 80 cm³, 90 cm³, 100 cm³, 150 cm³, 200 cm³, 300 cm³, 500 cm³, 750 cm³, 1000 cm³, 5000 cm³, 10,000 cm³, 100,000 cm³, 1 m³, or 10 m³.

In some embodiments, the movable object may have a footprint (which may refer to the lateral cross-sectional area encompassed by the movable object) less than or equal to about: 32,000 cm², 20,000 cm², 10,000 cm², 1,000 cm², 500 cm², 100 cm², 50 cm², 10 cm², or 5 cm². Conversely, the footprint may be greater than or equal to about: 32,000 cm², 20,000 cm², 10,000 cm², 1,000 cm², 500 cm², 100 cm², 50 cm², 10 cm², or 5 cm².

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 21:
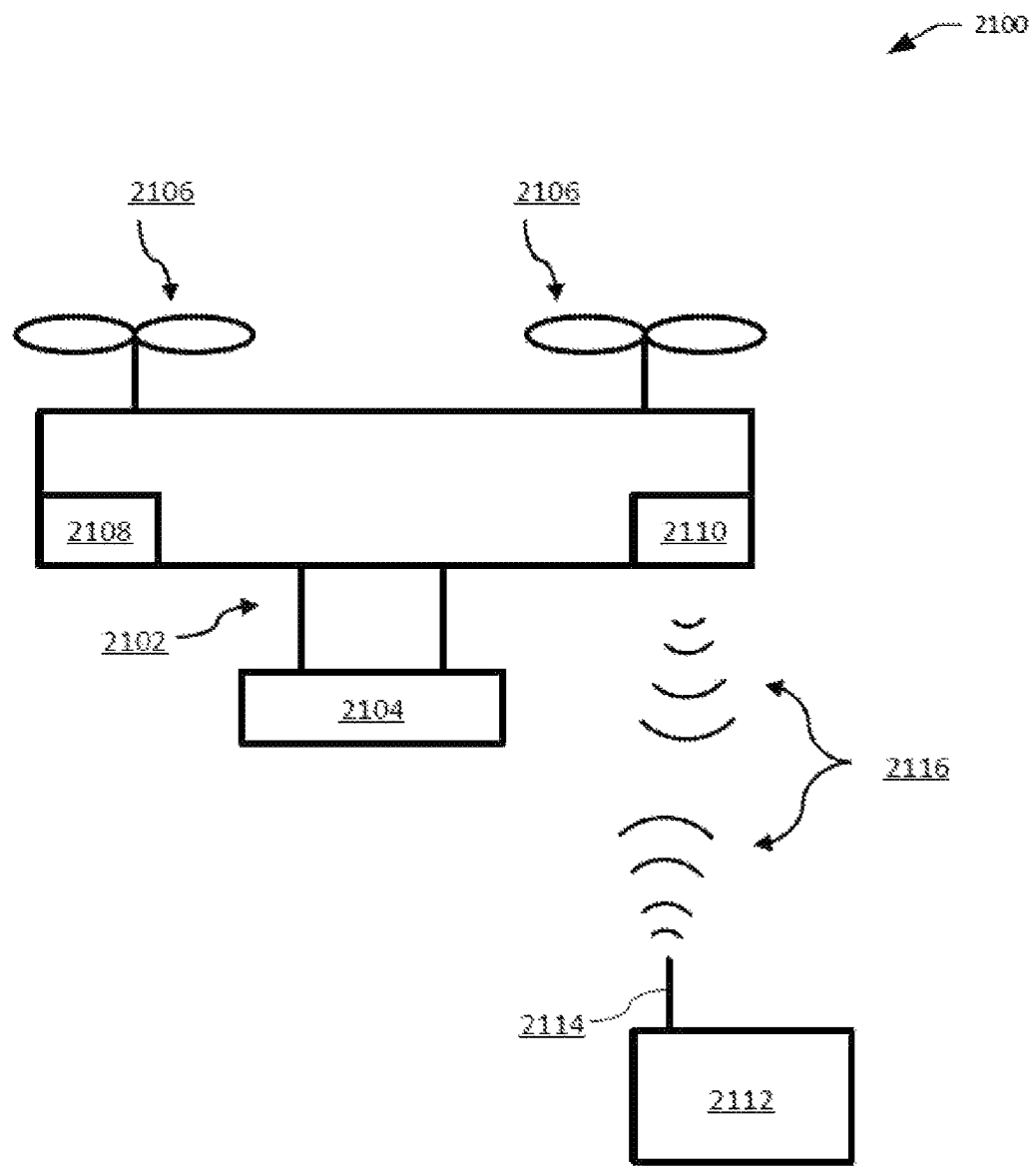
FIG. 21 illustrates a movable object including a carrier and a payload, in accordance with embodiments.

FIG. 21 illustrates a movable object 2100 including a carrier 2102 and a payload 2104, in accordance with embodiments. Although the movable object 2100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2104 may be provided on the movable object 2100 without requiring the carrier 2102. The movable object 2100 may include propulsion mechanisms 2106, a sensing system 2108, and a communication system 2110.

The propulsion mechanisms 2106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2106 can be mounted on the movable object 2100 using any suitable means, such as a support element (e.g., a drive shaft) as described elsewhere herein. The propulsion mechanisms 2106 can be mounted on any suitable portion of the movable object 2100, such on the top, bottom, front, back, sides, or suitable combinations thereof.

In some embodiments, the propulsion mechanisms 2106 can enable the movable object 2100 to take off vertically from a surface or land vertically on a surface without requiring any horizontal movement of the movable object 2100 (e.g., without traveling down a runway). Optionally, the propulsion mechanisms 2106 can be operable to permit the movable object 2100 to hover in the air at a specified position and/or orientation. One or more of the propulsion mechanisms 2100 may be controlled independently of the other propulsion mechanisms. Alternatively, the propulsion mechanisms 2100 can be configured to be controlled simultaneously. For example, the movable object 2100 can have multiple horizontally oriented rotors that can provide lift and/or thrust to the movable object. The multiple horizontally oriented rotors can be actuated to provide vertical takeoff, vertical landing, and hovering capabilities to the movable object 2100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 2100 (e.g., with respect to up to three degrees of translation and up to three degrees of rotation).

The sensing system 2108 can include one or more sensors that may sense the spatial disposition, velocity, and/or acceleration of the movable object 2100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2108 can be used to control the spatial disposition, velocity, and/or orientation of the movable object 2100 (e.g., using a suitable processing unit and/or control module, as described below). Alternatively, the sensing system 2108 can be used to provide data regarding the environment surrounding the movable object, such as weather conditions, proximity to potential obstacles, location of geographical features, location of manmade structures, and the like.

The communication system 2110 enables communication with terminal 2112 having a communication system 2114 via wireless signals 2116. The communication systems 2110, 2114 may include any number of transmitters, receivers, and/or transceivers suitable for wireless communication. The communication may be one-way communication; such that data can be transmitted in only one direction. For example, one-way communication may involve only the movable object 2100 transmitting data to the terminal 2112, or vice-versa. The data may be transmitted from one or more transmitters of the communication system 2110 to one or more receivers of the communication system 2112, or vice-versa. Alternatively, the communication may be two-way communication, such that data can be transmitted in both directions between the movable object 2100 and the terminal 2112. The two-way communication can involve transmitting data from one or more transmitters of the communication system 2110 to one or more receivers of the communication system 2114, and vice-versa.

In some embodiments, the terminal 2112 can provide control data to one or more of the movable object 2100, carrier 2102, and payload 2104 and receive information from one or more of the movable object 2100, carrier 2102, and payload 2104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2106), or a movement of the payload with respect to the movable object (e.g., via control of the carrier 2102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2108 or of the payload 2104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2112 can be configured to control a state of one or more of the movable object 2100, carrier 2102, or payload 2104. Alternatively or in combination, the carrier 2102 and payload 2104 can also each include a communication module configured to communicate with terminal 2112, such that the terminal can communicate with and control each of the movable object 2100, carrier 2102, and payload 2104 independently.

In some embodiments, the movable object 2100 can be configured to communicate with another remote device in addition to the terminal 2112, or instead of the terminal 2112. The terminal 2112 may also be configured to communicate with another remote device as well as the movable object 2100. For example, the movable object 2100 and/or terminal 2112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2100, receive data from the movable object 2100, transmit data to the terminal 2112, and/or receive data from the terminal 2112. Optionally, the remote device can be connected to the Internet or other telecommunications network, such that data received from the movable object 2100 and/or terminal 2112 can be uploaded to a web site or server.

Figure 22:
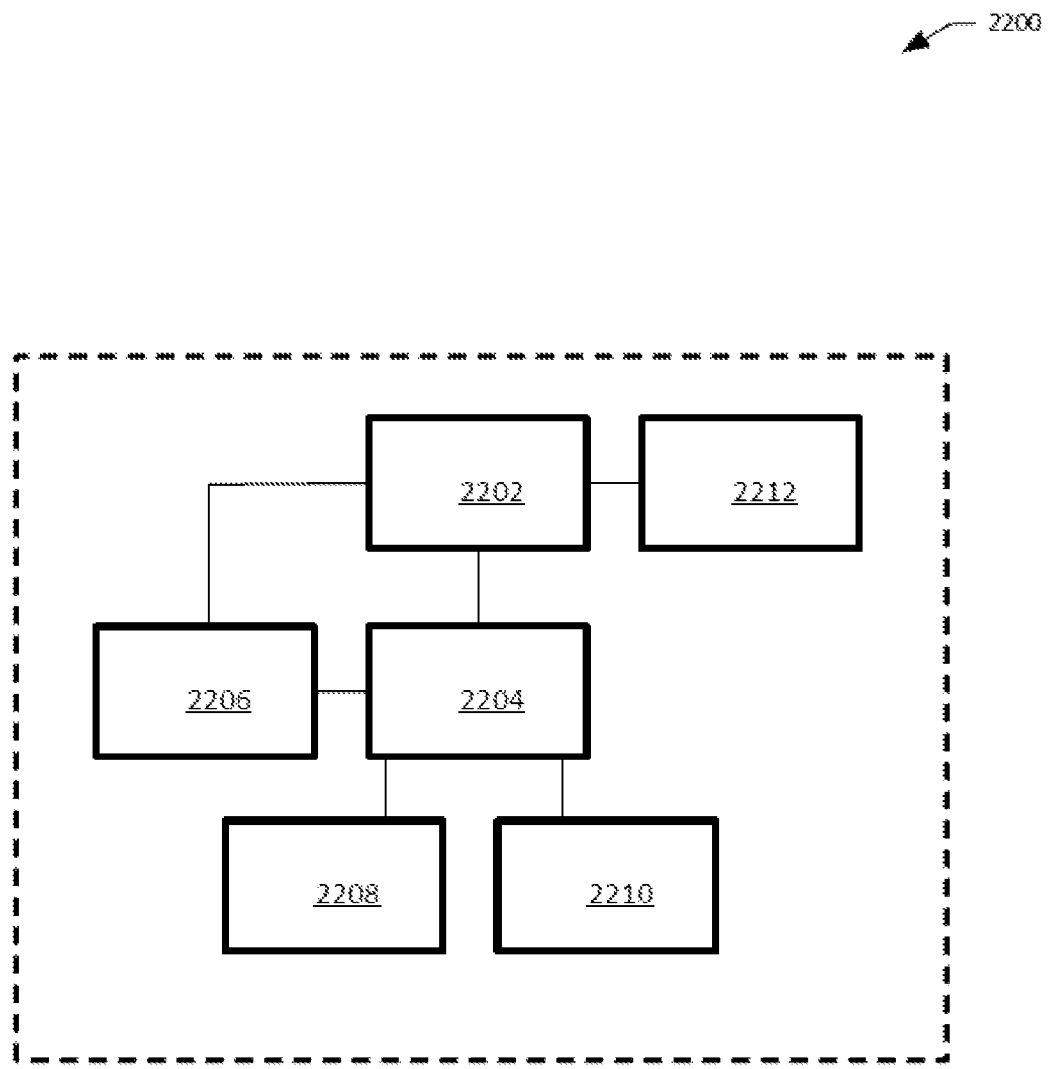
FIG. 22 is a schematic illustration by way of block diagram of a system for controlling a movable object, in accordance with embodiments.

FIG. 22 is a schematic illustration by way of block diagram of a system 2200 for controlling a movable object, in accordance with embodiments. The system 2200 can be used in combination with any suitable embodiment of the systems, devices, and methods disclosed herein. The system 2200 can include a sensing module 2202, processing unit 2204, non-transitory computer readable medium 2206, control module 2208, and communication module 2210.

The sensing module 2202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 2202 can be operatively coupled to a processing unit 2204 having a plurality of processors. In some embodiments, the sensing module can be operatively coupled to a transmission module 2212 (e.g., a Wi-Fi image transmission module) configured to directly transmit sensing data to a suitable external device or system. For example, the transmission module 2212 can be used to transmit images captured by a camera of the sensing module 2202 to a remote terminal.

The processing unit 2204 can have one or more processors, such as a programmable or non-programmable processor (e.g., a central processing unit (CPU), a microprocessor, an FPGA, an application—specific integrated circuit (ASIC)). The processing unit 2204 can be operatively coupled to a non-transitory computer readable medium 2206. The non-transitory computer readable medium 2206 can store logic, code, and/or program instructions executable by the processing unit 2204 for performing one or more steps. The non-transitory computer readable medium can include one or more memory units (e.g., removable media or external storage such as an SD card or random access memory (RAM)). In some embodiments, data from the sensing module 2202 can be directly conveyed to and stored within the memory units of the non-transitory computer readable medium 2206. The memory units of the non-transitory computer readable medium 2206 can store logic, code and/or program instructions executable by the processing unit 2204 to perform any suitable embodiment of the methods described herein. The memory units can store sensing data from the sensing module to be processed by the processing unit 2204. In some embodiments, the memory units of the non-transitory computer readable medium 2206 can be used to store the processing results produced by the processing unit 2204.

In some embodiments, the processing unit 2204 can be operatively coupled to a control module 2208 configured to control a state of the movable object. For example, the control module 2208 can be configured to control the propulsion mechanisms of the movable object to adjust the spatial disposition, velocity, and/or acceleration of the movable object with respect to six degrees of freedom. Alternatively or in combination, the control module 2208 can control one or more of a state of a carrier, payload, or sensing module.

The processing unit 2204 can be operatively coupled to a communication module 2210 configured to transmit and/or receive data from one or more external devices (e.g., a terminal, display device, or other remote controller). Any suitable means of communication can be used, such as wired communication or wireless communication. For example, the communication module 2210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 2210 can transmit and/or receive one or more of sensing data from the sensing module 2202, processing results produced by the processing unit 2204, predetermined control data, user commands from a terminal or remote controller, and the like.

The components of the system 2200 can be arranged in any suitable configuration. For example, one or more of the components of the system 2200 can be located on the movable object, carrier, payload, terminal, sensing system, or an additional external device in communication with one or more of the above. Additionally, although FIG. 22 depicts a single processing unit 2204 and a single non-transitory computer readable medium 2206, one of skill in the art would appreciate that this is not intended to be limiting, and that the system 2200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 2200 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A computer-implemented method for tracking multiple targets, comprising:
   identifying a plurality of targets based on a plurality of images obtained from an imaging device carried by an unmanned aerial vehicle (UAV) via a carrier;
   determining a target group comprising two or more targets from the plurality of targets, including selecting, based on dimensions of the two or more targets, the two or more targets from the plurality of targets;
   detecting a change of a bounding box of the target group, the bounding box enclosing the two or more targets; and
   controlling at least one of the UAV or the carrier to track the target group as a whole as the target group moves, including:
      controlling, based on the change of the bounding box of the target group, the at least one of the UAV or the carrier to track the target group as a whole as the target group moves.

2. The method of claim 1, wherein determining the target group further comprises selecting the two or more targets from the plurality of targets based on a target state associated with each of the two or more targets.

3. The method of claim 2, wherein the target state of a target includes a proximity of the target to another target or to a predetermined reference point.

4. The method of claim 1, wherein determining the target group further comprises selecting the two or more targets from the plurality of targets based on a primary target.

5. The method of claim 1, further comprising determining a target group state of the target group based on a target state of each of the two or more targets.

6. The method of claim 5, wherein the target group state or the target state comprises at least one of a position, a size, a velocity, or an orientation.

7. The method of claim 5, wherein the target group state of the target group is determined as a weighted average of the target states of the two or more targets in the target group.

8. The method of claim 1, further comprising updating the target group and controlling at least one of the UAV or the imaging device to track the updated target group.

9. One or more non-transitory computer-readable storage media storing computer-executable instructions that, when executed by a computing system, configure the computing system to perform the method of claim 1.

10. The method of claim 1, further comprising:
    determining a target group state of the target group, the target group state including a group velocity;
    wherein controlling the at least one of the UAV or the carrier to track the target group as the target group moves further includes:
       controlling, based on the target group state, the at least one of the UAV or the carrier to track the target group as the target group moves.

11. The method of claim 1, further comprising:
    detecting bounding box information of a bounding box associated with each of the two or more targets; and
    determining a target group state of the target group based on the bounding box information associated with each of the two or more targets;
    wherein controlling the at least one of the UAV or the carrier to track the target group as a whole as the target group moves further includes:
       controlling, based on the target group state of the target group, the at least one of the UAV or the carrier to track the target group as a whole as the target group moves.

12. The method of claim 1, wherein:
    controlling the at least one of the UAV or the carrier to track the target group as the target group moves further includes:
       controlling the UAV and the carrier to track the target group as the target group moves.

13. The method of claim 1, wherein determining the target group further comprises selecting, by comparing velocities of the plurality of targets with a velocity of a primary target, the two or more targets from the plurality of targets.

14. The method of claim 1, wherein determining the target group further comprises selecting, by comparing relative distances of the plurality of targets with respect to a primary target, the two or more targets from the plurality of targets.

15. A tracking system, comprising:
    a memory that stores one or more computer-executable instructions; and
    one or more processors configured to access the memory and execute the computer-executable instructions to perform a method comprising:
    identifying a plurality of targets based on a plurality of images obtained from an imaging device carried by an unmanned aerial vehicle (UAV) via a carrier;
    determining a target group comprising two or more from the plurality of targets, including selecting, based on dimensions of the two or more targets, the two or more targets from the plurality of targets;
    detecting a change of a bounding box of the target group, the bounding box enclosing the two or more targets; and
    controlling at least one of the UAV or the carrier to track the target group as a whole as the target group moves, including:
       controlling, based on the change of the bounding box of the target group, the at least one of the UAV or the carrier to track the target group as a whole as the target group moves.

16. The system of claim 15, wherein determining the target group comprises selecting the two or more targets from the plurality of targets based on a target state associated with each of the two or more targets.

17. The system of claim 15, wherein determining the target group comprises selecting the two or more targets from the plurality of targets based on a primary target.

18. The system of claim 15, wherein the method further comprises determining a target group state of the target group based on a target state of each of the two or more targets.

19. The system of claim 18, wherein the target group state or the target state comprises at least one of a position, a size, a velocity, or an orientation.

20. A computer-implemented method for tracking multiple targets, comprising:
    identifying a plurality of targets based on a plurality of images obtained from an imaging device carried by an unmanned aerial vehicle (UAV) via a carrier;
    determining a target group comprising two or more targets from the plurality of targets, including selecting, based on dimensions of the two or more targets, the two or more targets from the plurality of targets;
    detecting bounding box information of a bounding box associated with each of the two or more targets;

determining a target group state of the target group based on the bounding box information associated with each of the two or more targets; and controlling, based on the target group state of the target group, the at least one of the UAV or the carrier to track the target group as a whole as the target group moves.

\* \* \* \* \*